United States Patent [19]

Okamoto

[11] Patent Number: 5,528,754
[45] Date of Patent: Jun. 18, 1996

[54] COMMUNICATION CONTROLLING APPARATUS

[75] Inventor: Yasushi Okamoto, Itami, Japan

[73] Assignee: Mitsubishi Denki Kabushiki Kaisha, Tokyo, Japan

[21] Appl. No.: 359,769

[22] Filed: Dec. 20, 1994

[30] Foreign Application Priority Data

Dec. 21, 1993 [JP] Japan ................................. 5-322588

[51] Int. Cl.⁶ ................................................. G06F 11/00
[52] U.S. Cl. ................................................. 395/183.19
[58] Field of Search ........................... 395/183.19, 183.2

[56] References Cited

U.S. PATENT DOCUMENTS

| | | | |
|---|---|---|---|
| 3,790,769 | 2/1974 | Ziegler | 235/153 AK |
| 4,527,271 | 7/1985 | Hallee | 371/20 |
| 4,930,119 | 5/1990 | Kobayashi | 370/16.1 |
| 5,267,251 | 11/1993 | Lenoir | 371/57.2 |
| 5,351,040 | 9/1994 | Matsuura | 340/825.05 |

*Primary Examiner*—Robert W. Beausoliel, Jr.
*Assistant Examiner*—Glenn Snyder
*Attorney, Agent, or Firm*—Lowe, Price, LeBlanc & Becker

[57] ABSTRACT

A communication controlling apparatus comprising a transmission line error detecting circuit 30 which determines whether a transmission line error is detected or not in the data transmitted from its own node without immediately disabling a P-channel MOS transistor 20 or N-channel MOS transistor 21 as output gates when an error is detected in one of the transmission lines (BUS+line 11 or BUS–line 12), a sequence control circuit 31 which informs all the other nodes that the error is detected in its own node, and a selector 27 which determines whether the transmission line error detecting circuit 30 has detected or not the transmission line error in the transmit start (SOF) period and selects a differential comparator. The reliability of communication is improved when an error is detected in one of the transmission lines.

6 Claims, 30 Drawing Sheets

V11: VOLTAGE OF BUS +LINE
V12: VOLTAGE OF BUS -LINE
V24: OUTPUT VOLTAGE OF 1st
    DIFFERENTIAL COMPARATOR

V11: VOLTAGE OF BUS +LINE
V23: REFERENCE VOLTAGE (VDD/2)
V25: OUTPUT VOLTAGE OF 2nd
     DIFFERENCE COMPARATOR

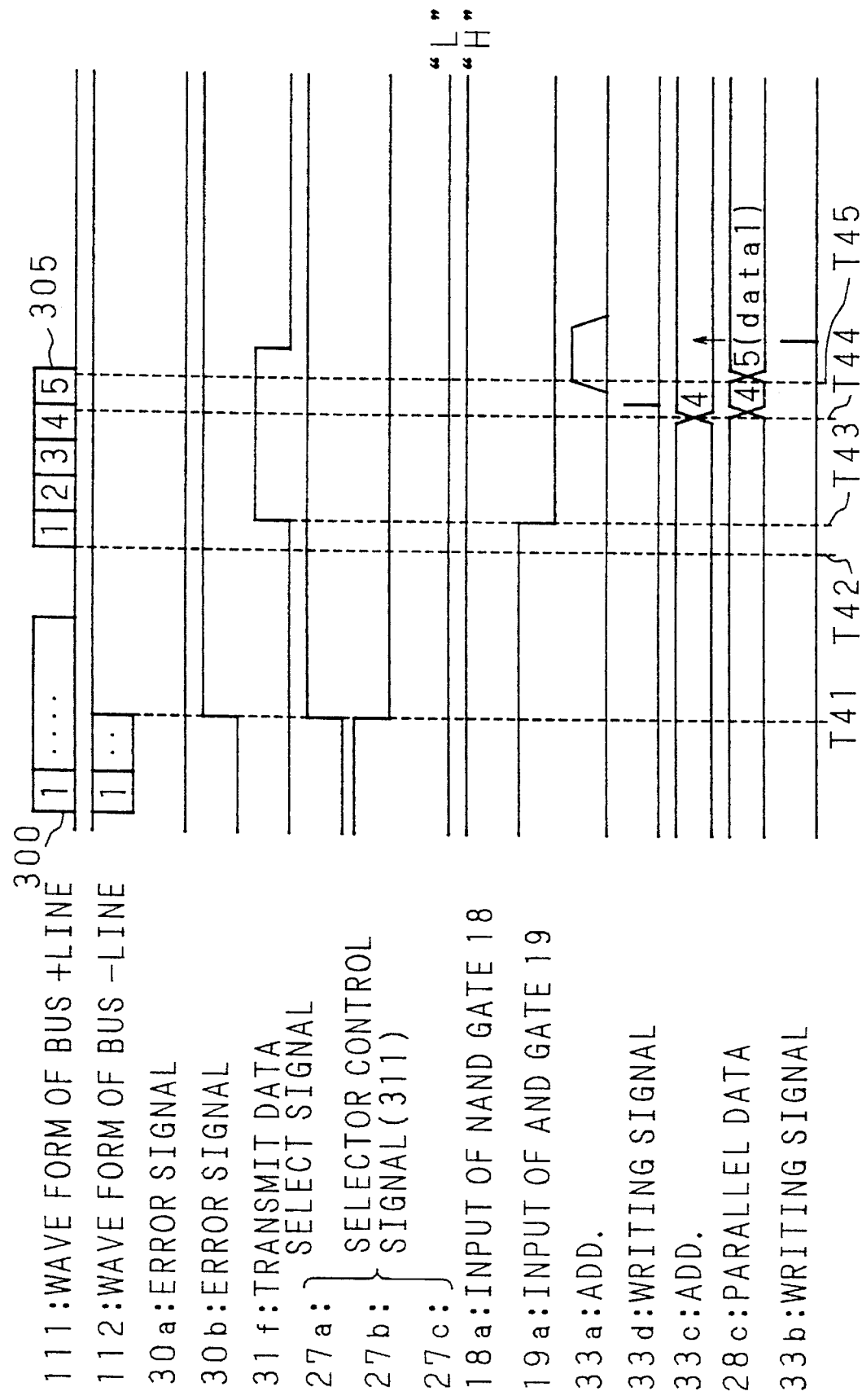

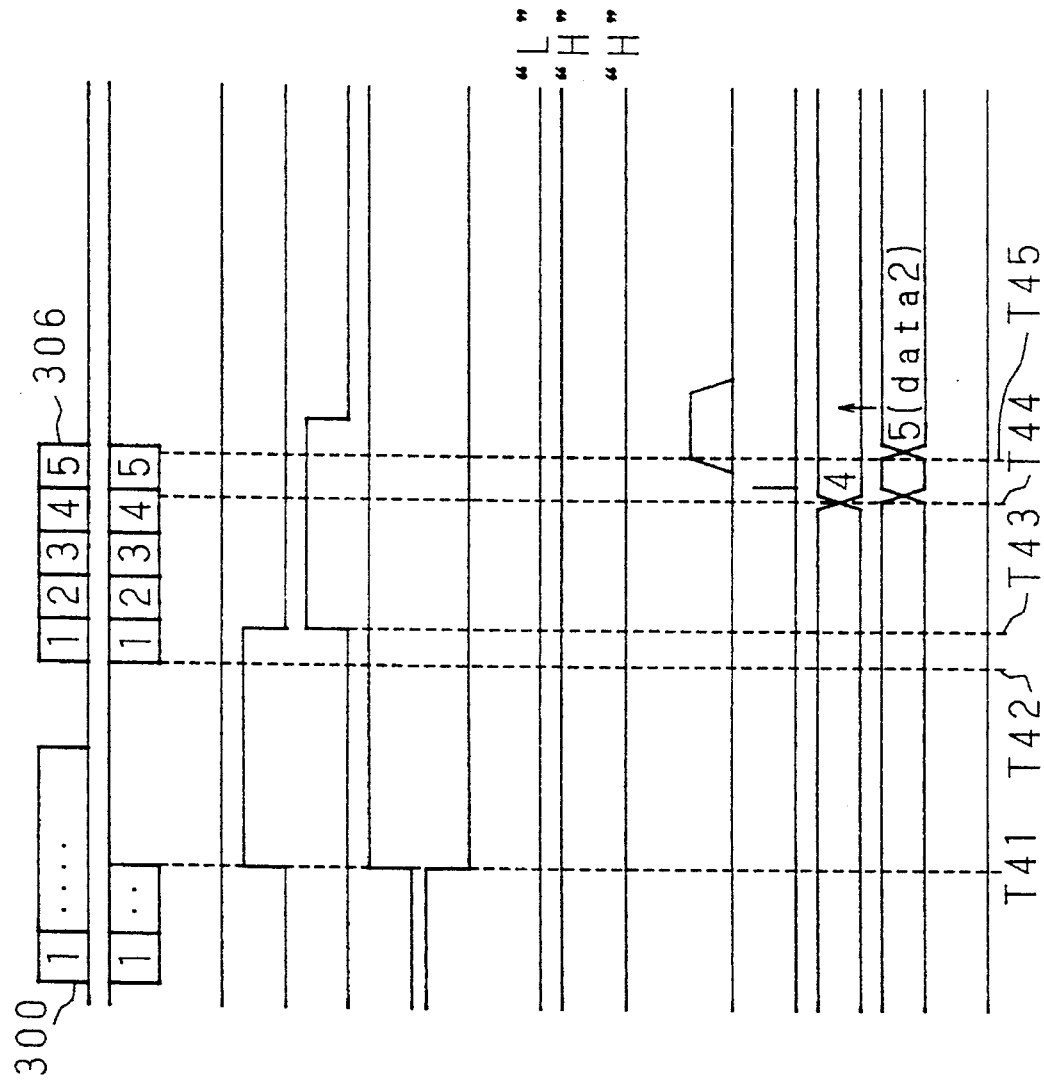

5,528,754

COMMUNICATION CONTROLLING APPARATUS

BACKGROUND OF THE INVENTION

1. Field of the Invention

The present invention is related to a communication controlling apparatus, particularly to a communication controlling apparatus capable of back-up when an error has occurred in one of the transmission lines in communication network wherein data are transferred via a transmission lines of two-wire common circuit transmission line.

2. Description of The Related Art

FIG. 1 is a schematic diagram showing a conventional two-wire LAN system and a plurality of nodes connected thereto.

Nodes N1, N2 ... Nn are connected to a BUS+line 11 and a BUS−line 12 which transmit mutually inverted signals as shown in FIG. 1. The lines 11 and 12 transmit and receive the message frames to configure a communication system. The message frames complying with a communications protocol must be used in order to configure the two-wire communication system. As an example of such a message frame, FIG. 2 schematically shows the configuration thereof which is designated as "Class B data communication network interface J1850".

A message frame shown in FIG. 2 indicated by reference numeral 9 comprises a code SOF (Start Of Frame) indicated by reference numeral 1 and meaning start of transmission, a priority code 2 which determines the priorities of transmission lines, a destination address 3, a self address 4, a data area 5, an EOD (End Of Data) 6 which is a code indicating the end of transmit data (these are included in a transmission frame 10), an IFR (In Frame Response) area 7 which returns the address of destination node as an acknowledgement when no receive error has occurred at the destination, and an EOF (End Of Frame) 8 which indicates the end of message frame.

FIG. 3 is a schematic diagram showing a pulse width modulated bit pattern defined in a PWM (pulse width modulation) bit format of "Class B data communication network interface J1850" above stated.

A one-bit area for data to be transmitted via the transmission lines comprises three areas which are termed as a Time and each Time has a width of 8 clock cycles.

Bit "0" indicated by reference numeral 100 is expressed by "H" level in both a first Time 63 and a second Time 64, and by "L" level in a third Time 65 as shown in FIG. 3. Bit "1" indicated by reference numeral 101 is expressed by "H" level in the first Time 63, and "L" level in both the second Time 64 and the third Time 65 as shown in FIG. 3.

The code SOF 1 which means the start of transmission is, as shown by reference numeral 102 in FIG. 3, expressed by "H" level in all the first Time 63, the second Time 64, the third Time 65, and a fourth Time 66, and by "L" level in both a fifth Time 67 and a sixth Time 68.

The code EOD 6 which means the end of transmission is, as shown by reference numeral 103 in FIG. 3, expressed by "L" level in all the first Time 63, the second Time 64 and the third Time 65.

The code EOF 8 which means the end of transmission is, as shown by reference numeral 104 in FIG. 3, expressed by "L" level in all the first Time 63 through the sixth Time 68.

Such pulse-width-modulated data is transmitted and received in a message frame format such as, for example, SAE J1850 shown in FIG. 2. When sending the transmit frame 10, the SOF 1 is transmitted and then the priority code 2, destination address 3, self address 4, data area 5 which is the PWM data comprising a bit. "0" or "1", and EOD 6 meaning the end of transmission of data area 5. When no error is detected in receive data, the receive side returns a peculiar address that is allocated to itself as the IFR area 7 after PWM modulation. Then, the EOF 8 meaning the end of one message frame is transmitted; that is, the transmission of the message frame 9 terminates.

The transmit circuit and receive circuit of the conventional communication controlling apparatus are described referring to FIG. 4.

In FIG. 4, reference numerals 11 and 12 indicate the BUS+line and BUS−line, respectively shown in FIG. 1, and a plurality of nodes of the same configuration indicated by reference symbol N are connected to these lines 11 and 12.

Reference numeral 16 indicates a transmit buffer memory in which data to be transmitted. The transmission buffer memory 16 stores each data of the priority code 2, destination address 3, self address 4 and data area 5 comprising the transmit frame 10 shown in FIG. 2.

Data stored in the transmit buffer memory 16 is, before transmissions composed into the transmit frame 10 shown in FIG. 2 by a transmit frame composing circuit 17 described later. No-conversion data of the transmit frame 10 is transmitted to the BUS+line 11 via a NAND gate indicated by reference numeral 18 and P-channel MOS transistor indicated by reference numeral 20; and inversion data transmitted to the BUS−line 12, being inverted, via an AND gate indicated by reference numeral 19 and an N-channel MOS transistor indicated by reference numeral 21. That is, transmit data is in opposite polarities in the BUS+line 11 and BUS−line 12 to each other.

In the P-channel MOS transistor 20, its source is connected to a voltage VDD of the power supply 22, its gate is connected to the output terminal of the NAND gate 18, and its drain is connected to the BUS+line 11 as well as grounded via a pull-down resistance 34. In the N-channel MOS transistor 21, its source is connected to a ground voltage GND, its gate is connected to the output terminal of the AND gate 19, and its drain is connected to the BUS−line 12 as well as to a voltage VDD of a power supply 22 via a pull-up resistance 35.

The reason why the drains of the P-channel MOS transistor 20 and N-channel MOS transistor 21 are used as outputs is to detect the collisions of communications by the priority code 2 which determines the exclusive right of transmission lines as described above. That is, when several nodes simultaneously start transmission, the waveform of one of the transmission nodes, which turns on the transistors 20 and 21 for a longer time, appears on the transmission line, and thus the transmission node gains the right to use the transmission line. Such priority control is not the subject of the present invention, and so further explanation is omitted.

Data waveform in the transmission line is inputted to the differential comparators indicated by reference numerals 24, 25 and 26 when it is received.

The BUS+line 11 is connected to the + side input terminal of the first differential comparator 24 and the BUS−line 12 is connected to the − side input terminal of the same. The BUS+line 11 is connected to the + side input terminal of the second differential comparator 25 and the BUS−line 12 is connected to the + side input terminal of the third differential comparator 26; and the − input terminals of the differential comparators 25 and 26 are connected to the voltage VDD/2 which is a half reference voltage supplied by a reference power supply 23. The outputs of these differential comparators 24, 25 and 26 are inputted to a selector 27.

The selector 27 usually outputs the output of the first differential comparator 24 to a receive frame decoding circuit 28. The receive frame decoding circuit 28 demodulates the received data and detects receive errors, and stores it in a receive buffer memory 29.

In FIG. 4, a transmission line error detecting circuit indicated by reference numeral 30 is connected to the BUS+line 11 and BUS−line 12, and it detects an error when either one of the line 11 or 12 is not operating. It determines the errors by various conditions; but it is not explained here because it is not the subject of the present invention.

When the transmission line error detecting circuit 30 detects an error in either line 11 or 12, one of the NAND gate 18 or AND gate 19 for driving the line 11 or 12 in which an error is detected respectively, is disabled. Concretely, transmission line error detecting circuit 30 disables and protects the P-channel MOS transistor 20 by setting a signal 18a inputted to the NAND gate 18 to the "L" level, and disables and protects the N-channel MOS transistor 21 by setting a signal 19a inputted to the AND gate 19 to the "L" level. At the same time, the selector 27 selects the second differential comparator 25 or third differential comparator 26 connected to the BUS+line 11 or BUS−line 12, respectively, wherein an error is not detected; whereby communications are switched to one of the above two lines with no error detected.

Problems in the prior art abovementioned are described referring to schematic diagrams in FIG. 5, FIG. 6 and FIG. 7 which show the state where troubles are generated in the schematic diagram in FIG. 1.

FIG. 5 shows the state where the BUS+line 11 is grounded because a trouble indicated by reference numeral 36 has occurred.

FIG. 6 shows the state where the BUS+line 11 is connected to the power supply because a trouble indicated by reference numeral 37 has occurred.

In the examples shown in FIG. 5 and FIG. 6, all the nodes N1, N2, N3 . . . detect errors on the BUS+line 11; therefore they disconnect the BUS+line 11 and switch to one-wire communication done only by the BUS−line 12.

FIG. 7 shows a state where a trouble indicated by reference numeral 38 has occurred in the first node N1 and the signal line connecting it to the BUS−line 12 is disconnected.

In the state shown in FIG. 7, the first node N1 detects an error in the BUS−line 12 from the state of the transmission line and so separates it and switches to one-wire communication done by the BUS+line 11. At this moment, the other nodes N2, N3 . . . have not detected the error. However, the first node N1 has switched to one-wire communication done by the BUS+line 11; therefore in the case where the first node N1 performs transmission to the other nodes N2, N3 . . . , only the BUS+line 11 is driven. Consequently, although the nodes N2, N3 . . . other than the first node N1 are normal themselves, they detect an error on the BUS−line 12. As the result, other than the first node N1, the nodes N2, N3 . . . switch to one-wire communication done-by the BUS+line 11; thus the entire system switches to one-wire communications state.

The problems of the prior art are described by referring to the schematic diagrams in FIG. 8 and FIG. 9.

In the conventional two-wire common circuit, when one of the two lines is defective, communication is secured by continuing transmitting and receiving by the other line which is not defective. This function (state) is termed one-wire backup function (state). However, in this state, there are following problems when compared with the state where two wires are normally operating.

FIG. 8 is a waveform diagram to explain an operation of the first differential comparator 24 shown in FIG. 4, and FIG. 9 is a waveform diagram to explain an operation of the second differential comparator 25 shown in the same. When two wires are normally operating, the signals received from the first differential comparator 24 are selected; when the BUS+line 11 is normally operating and the BUS−line 12 is not, the signals received from the second differential comparator 25 are selected. When the BUS−line 12 is normally operating and the BUS+line 11 is not, the signals received from the third differential comparator 26 are selected.

An output voltage V24 of the first differential comparator 24 whereto two signals from the BUS+line 11 and BUS−line 12 are inputted goes high ("H" level) when the voltage V11 of the BUS+line 11 is higher than the voltage V12 of the BUS−line 12 and goes low ("L" level) when the former is lower than the latter as shown in FIG. 8.

An output voltage V25 of the second differential comparator 25 whereto the signals from the BUS+line 11 and a voltage V23 (VDD/2) of the reference power supply 23 are inputted goes high ("H" level) when a voltage V11 of the BUS+line 11 is higher than the reference voltage V23 (VDD/2) and goes low ("L" level) when the former is lower than the latter as shown in FIG. 9.

The P-channel MOS transistor 20 and N-channel MOS transistor 21 driving the BUS+line 11 and BUS−line 12 respectively, are open drain output. Consequently, the rising delay at the time when the BUS+line 11 is changed from the "L" level to the "H" level is determined by the driving current of the P-channel MOS transistor 20. When the BUS+line 11 changes from the "H" level to the "L" level, its falling delay is determined by the stray capacitance of the transmission line and a pull-down resistance 34 regardless of the P-channel MOS transistor 20.

The same phenomena as shown in FIG. 9 are found in the BUS−line 12 connected to the third differential comparator 26 with only one difference in polarity.

When the stray capacitance of the BUS+line 11 is greater than that of the BUS−line 12, the time required for changing of the BUS+line 11 to "L" level from "H" level is longer than that required for changing of the BUS−line 12 to "H" level from "L" level as shown in FIG. 8. The rising delay and falling delay of a waveform of an output signal 241 of the first differential comparator 24 are assumed to be 40a and 41a, respectively, as shown in FIG. 8. The rising delay and falling delay of a waveform of an output signal 251 of the second differential comparator 25 are assumed to be 40b and 41b, respectively, as shown in FIG. 9.

In this case, concerning the rising delays 40a and 40b, the effect of stray capacitance can be made smaller by boosting up the current driving capabilities of the MOS transistors 20 and 21. However, the falling delays 41a and 41b are influenced by the stray capacitance and the time for the falling delay of the BUS+line 11 becomes long as shown in FIG. 8 and FIG. 9. When looking at the waveforms of the output signals 241 and 251 of the first differential comparator 24 and second differential comparator 25, respectively, the rising delay 41a of the former is shorter than the falling delay 41b of the latter. This is caused by that the voltage V23 of the reference power supply 23 for the second differential comparator 25 is fixed to VDD/2.

As described above, since the output of the second differential comparator 25 or third differential comparator 26 is selected, their rising and falling delays are influenced by the stray capacitance of transmission lines when the system is in the one-wire backup state in the communications networks where data is transmitted and received via the conventional two-wire common circuit transmission lines. The higher data transfer speed is, the greater problem of the delays is. Consequently, it is required that one-wire communication be avoided as much as possible in the two-wire common circuit.

SUMMARY OF THE INVENTION

The present invention has been devised in the above stated situation. The object of the present invention is to provide a communication controlling apparatus; wherein in case an error is detected on one of the transmission lines, the output gate is not immediately disabled but, transmission of data from the node continues, and a determination is made, whether or not a transmission line error is detected in the data transmitted from the node. In this way, a state in which an error appears to have been detected (although it has not occurred) can be avoided. An error detected at one's own node is communicated to the other nodes. Depending on whether a transmission line error is detected or not in the SOF area, a determination is made to select a particular differential comparator. This avoids unnecessary switching to one-wire communication and quickly detects an error when it has occurred in the transmission lines to improve the reliability of the communication system.

The communication controlling apparatus related to the present invention has error detecting means; wherein in the case where a circuit error is detected in one transmission line, the output gate is not immediately disabled but error detection data is transmitted from its own node and then whether a transmission line error is detected or not for the error detection data transmitted from it is determined.

The communication controlling apparatus related to the present invention has controlling means; wherein when its own node has detected a circuit error, the error notification data for informing of that condition is transmitted to all the other nodes.

The communication controlling apparatus related to the present invention has storing means for storing in which node circuit error is detected and controlling means signal which allows data to be received intact when it is received from the node and detects circuit errors in its own node when the data which is transmitted by using one transmission line is received from the other nodes.

The communication controlling apparatus related to the present invention has controlling means; wherein when its own node has detected no circuit errors, the error notification data to inform that is transmitted to all the other nodes.

The communication controlling apparatus related to the present invention has controlling means; wherein when its own node has detected a circuit error, the error notification data for informing that is transmitted to all the other nodes and when it has detected no circuit error, the error notification data for informing that is also transmitted to all the other nodes.

The communication controlling apparatus related to the present invention has error detecting means for detecting circuit errors in the transmission start period (SOF) of data.

In the communication controlling apparatus related to the present invention, wherein when an error is detected in one transmission line, the output gate is not immediately disabled but its own node temporarily transmits error detection data and whether circuit errors are detected or not is determined by the error detecting means.

In the communication controlling apparatus related to the present invention, when its own node has detected a circuit error, the error notification data for informing that is transmitted to all the other nodes by controlling means.

In the communication controlling apparatus related to the present invention, the fact that a node where circuit error is detected are stored, data is received intact from the node where circuit error is detected, and when data is received from the other node, its own node detects circuit errors.

In the communication controlling apparatus related to the present invention, when its own node has detected no circuit error, the error notification data for informing that is transmitted to all the other nodes by controlling means; in this way the nodes where circuit errors are detected are known.

In the communication controlling apparatus related to the present invention, when circuit error is detected in some nodes, error notification data for informing that is transmitted from them to all the other nodes and when circuit errors are not detected in the other nodes, error notification data for informing that is also transmitted from them to all the other nodes.

In the communication controlling apparatus related to the present invention, circuit error is detected in the SOF period by error detecting means.

The above and further objects and features of the invention will more fully be apparent from the following detailed description with accompanying drawings.

BRIEF DESCRIPTION OF THE DRAWINGS

FIG. 29 is a timing chart showing a operation at the time when an error has been detected in the embodiment 4 of the communication controlling apparatus related to the present invention; and FIG. 30 is a timing chart showing an operation at the time when no error has been detected in the embodiment 4 of the communication controlling apparatus related to the present invention.

DESCRIPTION OF THE PREFERRED EMBODIMENTS

The present invention is described with reference to the drawings showing the embodiments as follows.

[Embodiment 1]

At first, a configuration of a transmit/receive circuit of an embodiment 1 of the communication controlling apparatus related to the present invention is described with reference to a block diagram in FIG. 10.

Figure 10:
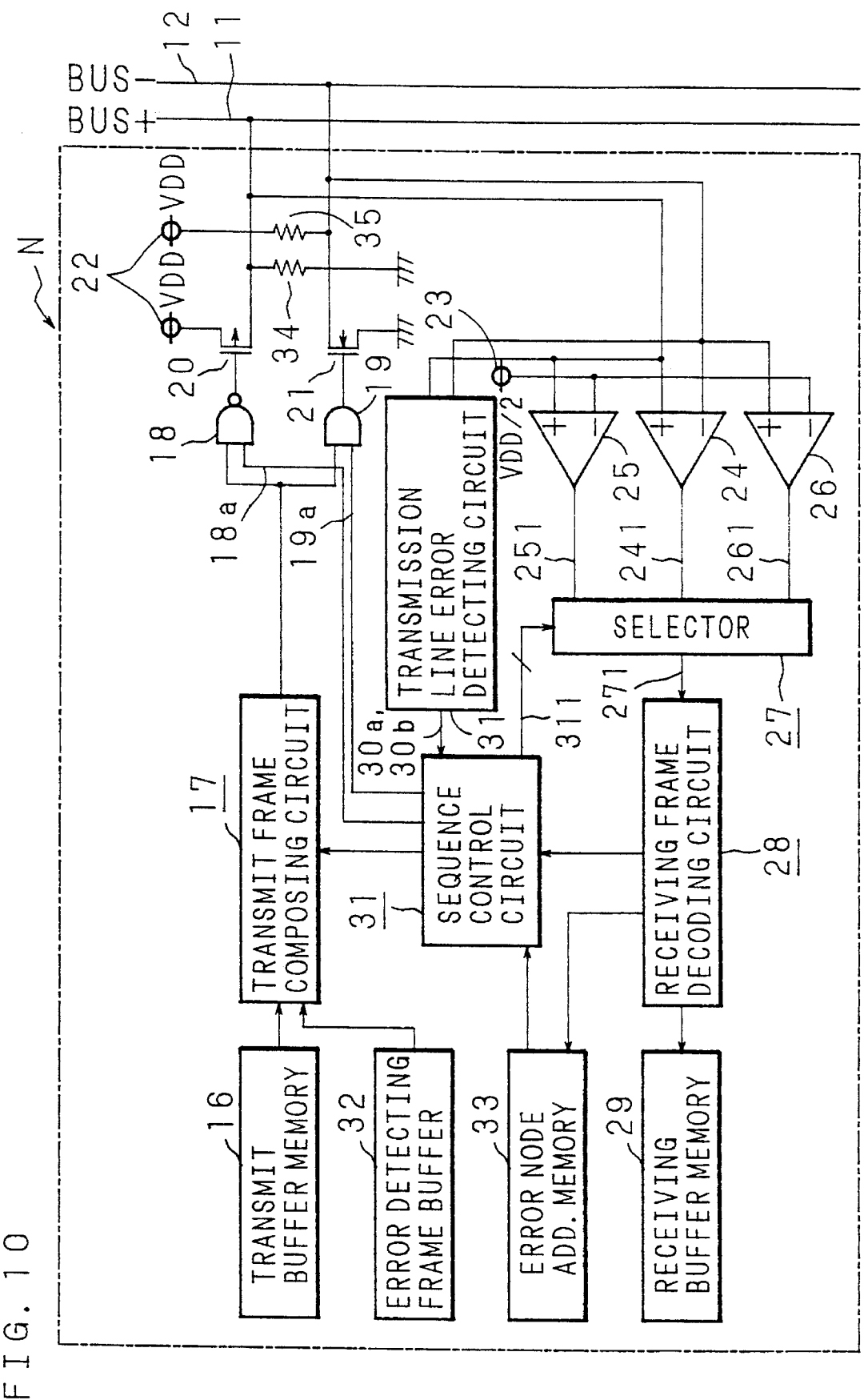
FIG. 10 is a block diagram showing a configuration of a transmit/receive circuit of an embodiment 1 of a communication controlling apparatus related to the present invention.

In FIG. 10, reference numerals 11 and 12 indicate the BUS+line as the first line and the BUS−line as the second line, respectively. A plurality of nodes of the same configuration indicated by reference symbol N which are the communication controlling apparatuses related to the present invention are connected to these lines.

Reference numeral 16 indicates a transmit buffer memory as first storing means for storing data to be transmitted. In the transmit buffer memory 16, each data of the priority code 2, destination address 3, self address 4 and data area 5 which compose transmit frame 10 shown in FIG. 2 stated above are stored.

Data stored in the transmit buffer memory 16 is composed to the transmit frame 10 shown in FIG. 2 by a transmit frame composing circuit 17 as transmit frame composing means described later and then sent out. Non-inversion data is sent out to the BUS+line 11 via the NAND gate indicated by reference numeral 18 and a P-channel MOS transistor indicated by reference numeral 20 as first signal outputting means, and an inversion data is sent out to the BUS−line 12 via an AND gate indicated by reference numeral 19 and an N-channel MOS transistor indicated by reference numeral 21 as the second signal outputting means. That is, waveforms in the BUS+line 11 and BUS−line 12 are always in opposite polarities to each other.

In the P-channel MOS transistor 20, its source is connected to the power supply voltage VDD, its gate is connected to the output terminal of the NAND gate 18, and its drain is connected to the BUS+line 11 as well as grounded via a pull-down resistance 34. in the N-channel MOS transistor 21, its source is connected to ground voltage GND, its gate is connected to the output terminal of the AND gate 19, and its drain is connected to the BUS−line 12 as well as the power supply voltage VDD via a pull-up resistance 35.

The reason why the drains of the P-channel MOS transistor 20 and N-channel MOS transistor 21 are used as the output terminals thereof is to detect the collisions in communication by the priority code 2 which determines the exclusive right of transmission lines in the same manner as for prior art described above. That is, when a plurality of nodes simultaneously start transmission, the waveform of one of the transmission nodes, which turns on the P-channel MOS transistor 20 and N-channel MOS transistor 21 for a longer time, appears on the transmission line, and thus the transmission node gains the right to use the transmission line. Such priority control is not the subject of the present invention, therefore further explanation is omitted.

Figure 11:
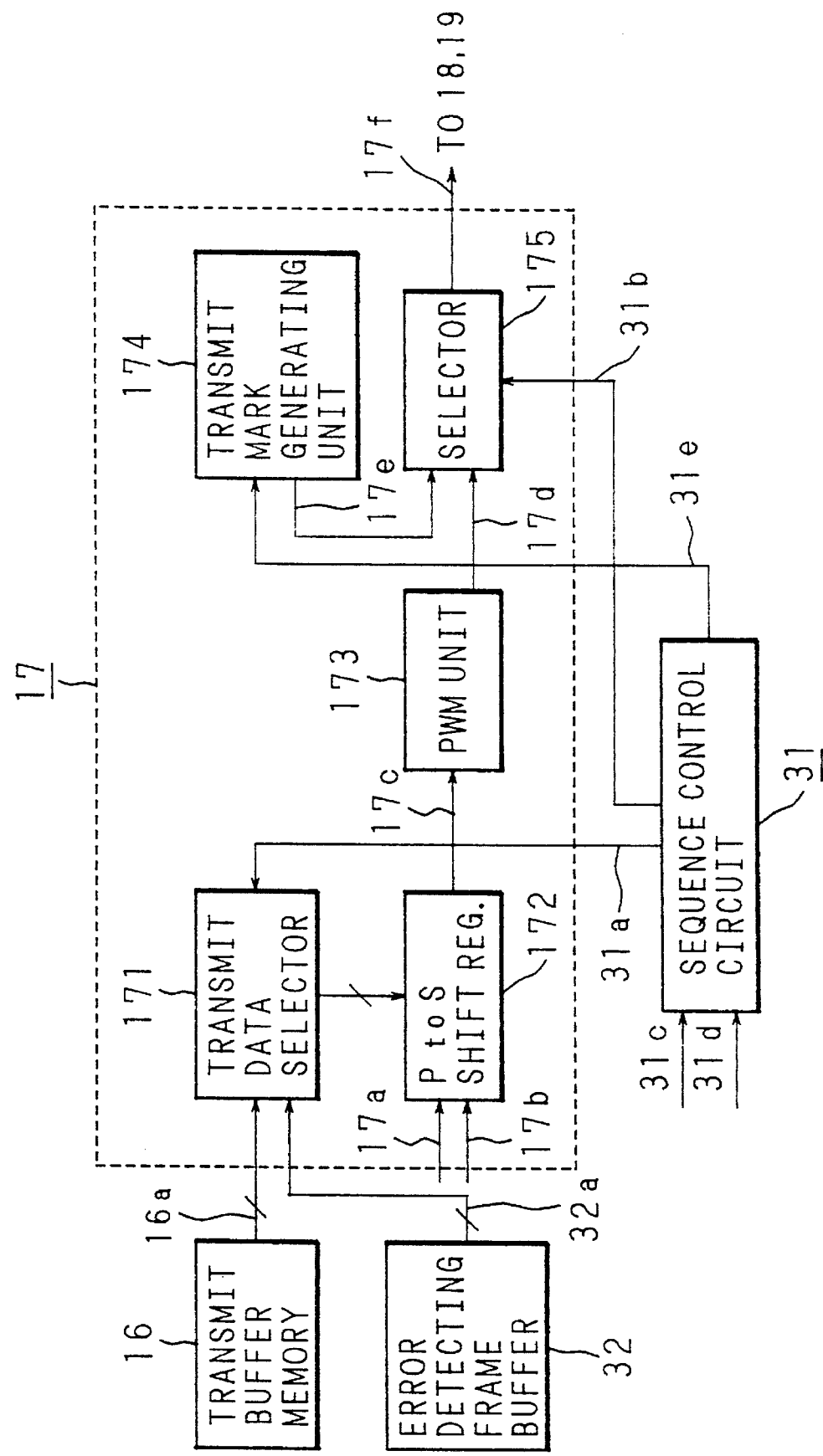
FIG. 11 is a block diagram showing a configuration of a transmit frame composing circuit 17 of the transmit/receive circuit of the embodiment 1 of the communication controlling apparatus related to the present invention and its peripheral devices, such as a transmit buffer memory, an error detecting frame buffer and a sequence control circuit.
Figure 12:
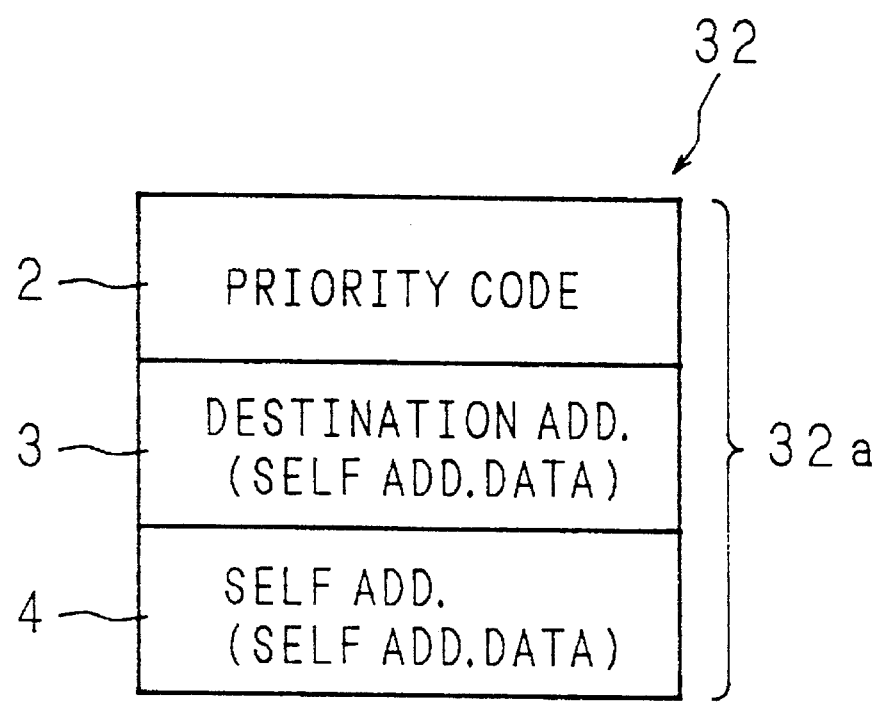
FIG. 12 is a schematic diagram showing a data which is to be transmitted at the time when an error is detected, and is stored in the error detecting frame buffer of the transmit/receive circuit of the embodiment 1 of the communication controlling apparatus related to the present invention.

Configuration of the transmit frame composing circuit 17 and its peripheral devices such as a transmit buffer memory 16, an error detecting frame buffer 32 as second storing means and a sequence control circuit 31 as controlling means is described referring to a block diagram of FIG. 11. FIG. 12 is a schematic diagram showing a data 32a to be transmitted at the time when an error is detected in a data stored in the error detecting frame buffer 32.

In FIG. 11, reference numeral 171 in the transmit frame composing circuit 17 indicates a transmit data selector. A data 16a to be transmitted stored in the transmit buffer memory 16 above stated and a data 32a to be transmitted when an error is detected stored in the error detecting frame buffer 32 described later are inputted to the transmit data selector 171. The data 32a stored in the error detecting frame buffer 32 comprises the priority code 2, destination address 3 and self address 4 as shown in FIG. 12.

The transmit data selector 171 selects either the data string 16a or 32a and outputs it to a PtoS shift register 172.

Figure 3:
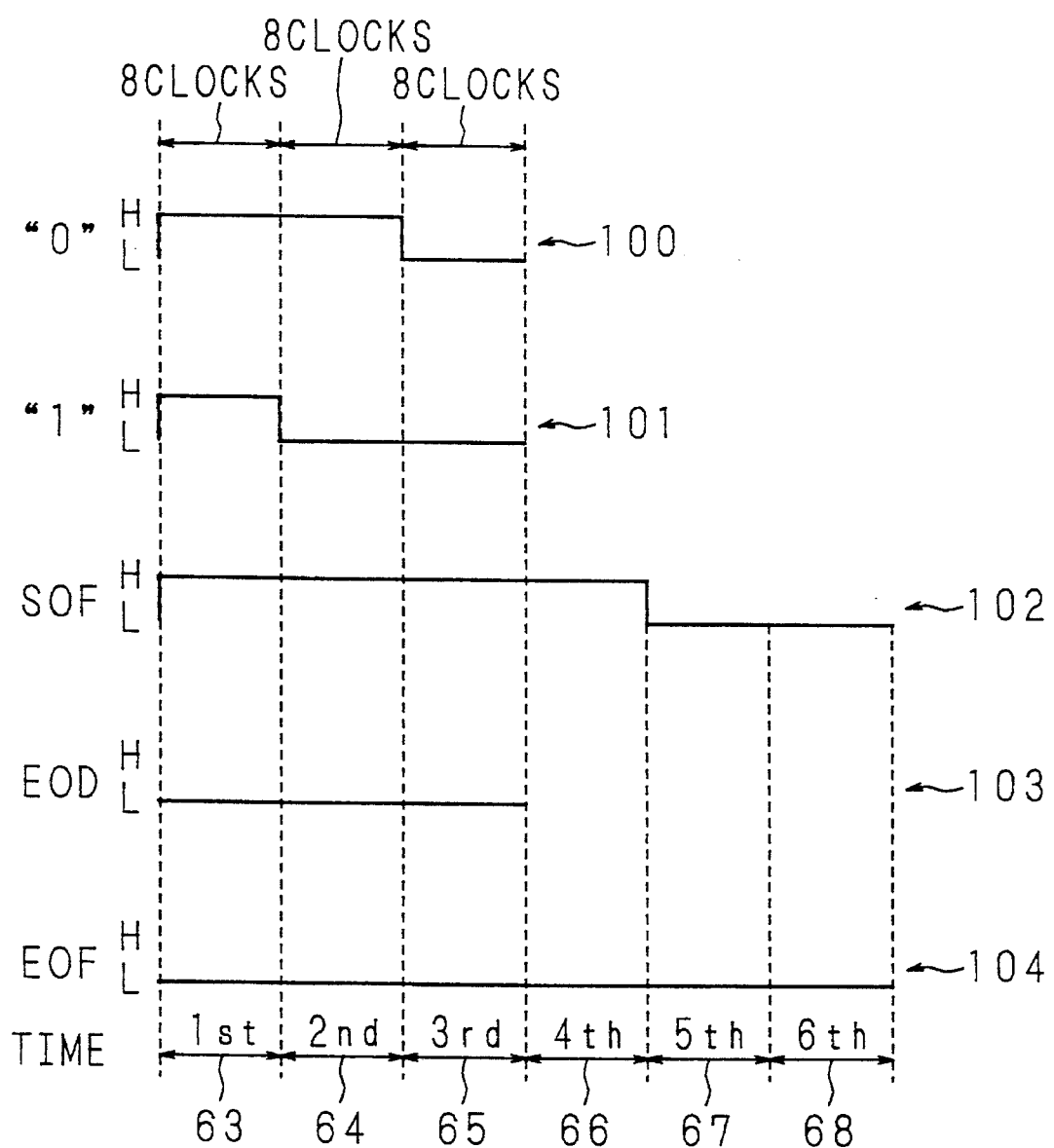
FIG. 3 is a schematic diagram showing a pulse-width-modulated bit pattern defined in the PWM pulse width modulation (PWM) bit format designated as "Class B data communication network interface J1850"
Figure 4:
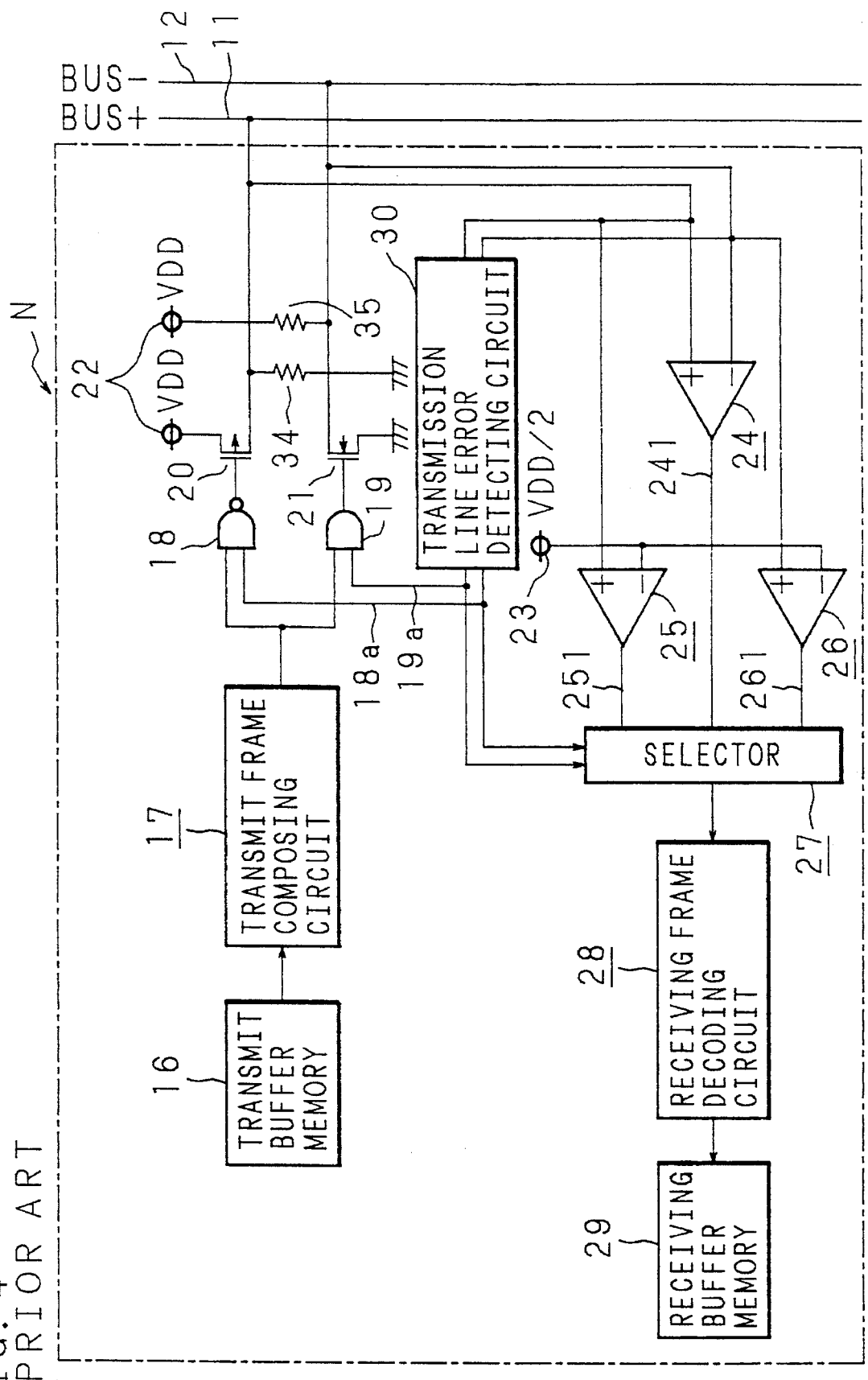
FIG. 4 is a block diagram showing a configuration of the transmit/receive circuit of the conventional communication controlling apparatus.
Figure 5:
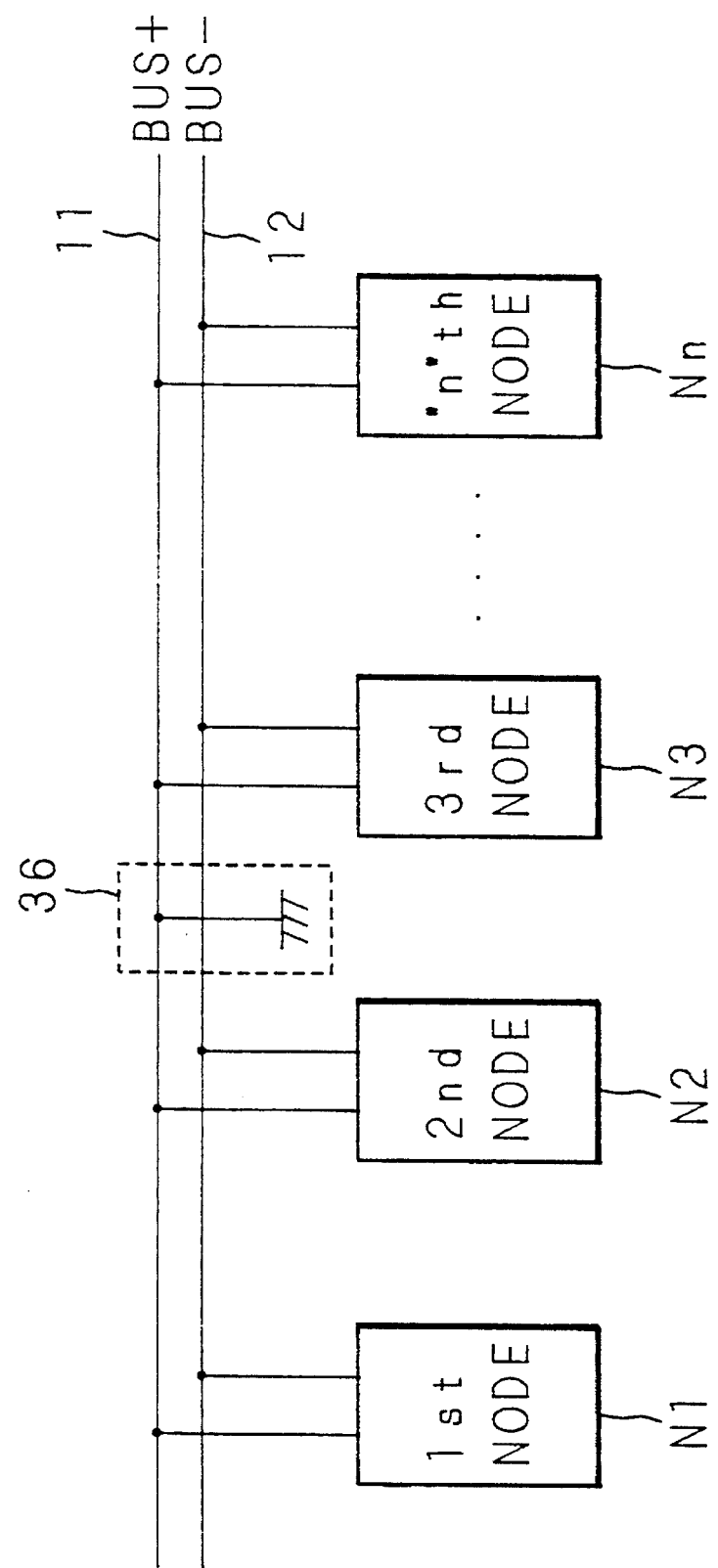
FIG. 5 is a schematic diagram showing a state where a trouble has occurred in a conventional two-wire LAN system and one of the lines is grounded.
Figure 6:
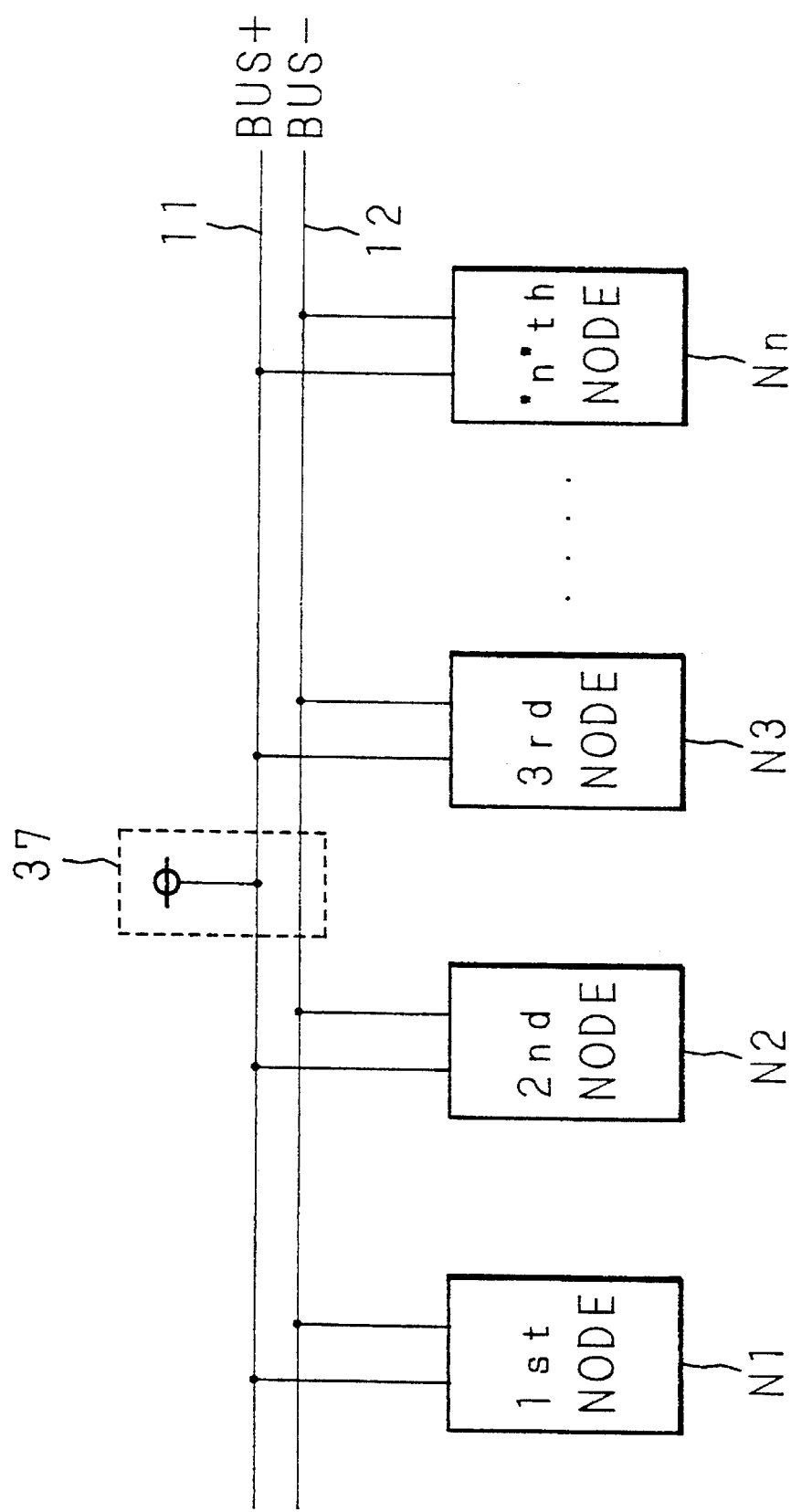
FIG. 6 is a schematic diagram showing a state where a trouble has occurred in a conventional two-wire system and one of the lines is connected to the power supply.

The PtoS shift register 172 is a shift register which converts parallel data outputted from the transmit data selector 171 into serial data. The serial data thus converted by the PtoS shift register 172 is further converted into a bit format as shown in FIG. 3 by the PWM unit 173.

Reference numeral 174 indicates a transmit mark generating unit which generates a transmit mark (SOF) 1 and sends it as a signal 17e to a selector 175.

The selector 175 selects either a pattern of the transmit mark (SOF) 1 generated by the transmit mark generating unit 174 or the bit pattern modulated by the PWM unit 173 as stated above and outputs selected pattern to the NAND gate 18 and AND gate 19.

When a transmit start flag 31e given from the sequence control circuit 31 becomes effective, all the components of the transmit frame composing circuit 17 is activated and the transmit mark generating unit 174 generates the SOF 1.

A selector 175, upon given a selector control signal 31b from the sequence control circuit 31, selects the SOF 1 outputted from the transmit mark generating unit 174 as the signal 17e and sends it to the NAND gate 18 and AND gate 19.

When a transmit data select signal 31a given from the sequence control circuit 31 described later is at the "H" level, the transmit data selector 171 selects the data 32a such as FIG. 12 stored in an error detecting frame buffer 32 and outputs it to the PtoS shift register 172.

Figure 13:
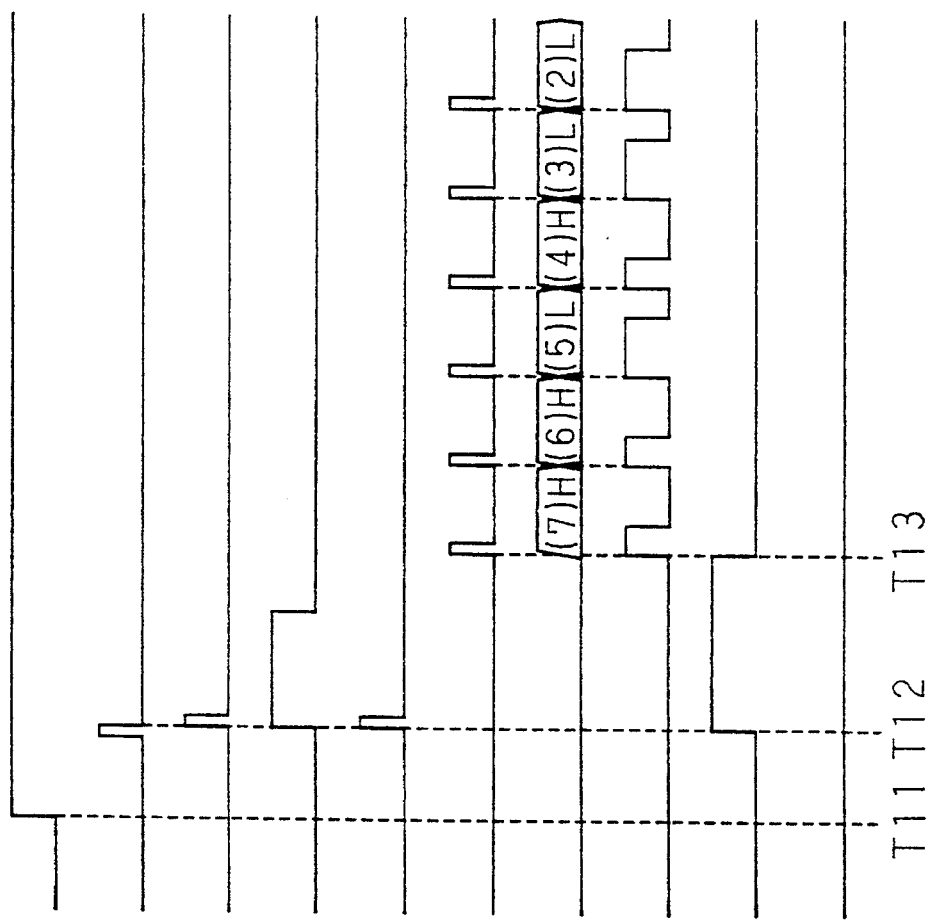
FIG. 13 is a timing chart showing an operation of a transmit frame composing circuit of the transmit/receive circuit of the embodiment 1 of the communication controlling apparatus related to the present invention.

The basic operation of the transmit frame composing circuit 17 having such configuration is described referring to a timing chart shown in FIG. 13.

In FIG. 13, it is assumed that the transmit data selector 171 in the transmit frame composing circuit 17 selects the data stored in the transmit buffer memory 16 by the transmit data select signal 31a given from the sequence control circuit 31.

At the timing T11 whereat data to be returned is written in the transmit buffer memory 16, a transmit buffer full signal indicated by reference numeral 31c rises to "H" level and is inputted to the sequence control circuit 31. A transmit enable flag 31d generated at a timing T12 which is the timing for transmission is inputted from the outside to a sequence control circuit 31. The sequence control circuit 31 generates a transmit start flag 31e indicating the start of transmission at a timing T12 corresponding to the transmit buffer full signal 31c described above and the transmit enable flag 31d are inputted. All the components in the transmit frame composing circuit 17 are activated by generation of the transmit start flag 31e.

Since all the components in the transmit frame composing circuit 17 are activated, the transmit start mark (SOF) 1 generated by the transmit mark generating unit 174 is inputted to the selector 175 as a signal 17e and 1-byte transmit data string corresponding to an address given to the transmit buffer memory 16 is taken into the PtoS shift register 172 by a PtoS load signal 17a.

At this timing, the selector 175 selects the SOF 1 outputted from the transmit mark generating unit 174 as the signal 17e by the selector control signal 31b given from the sequence control circuit 31. Consequently, the SOF 1 is sent from the transmit frame composing circuit 17 as a signal 17f via the selector 175.

At a timing T13 when the SOF 1 is outputted from the transmit frame composing circuit 17, the sequence control circuit 31 switches the selector control signal 31b given to the selector 175 so that the output of the PWM unit 173 (PWM output 17d) may be selected, as well as a PtoS shift clock pulse 17b is inputted to the PtoS shift register 172. With the rising to "H" level of the PtoS shift clock pulse 17b as a trigger, the PtoS shift register 172 performs a shift operation and the most significant output bit data (7) in 1-byte transmit data string taken in from the transmit buffer memory 16 is outputted as the PtoS shift register output 17c.

The PtoS shift register 172, by performing the shift operations in sequence with the rising to "H" level of the PtoS shift clock 17b as a trigger, converts the most significant output bit data (7) in 1-byte transmit data string to the least significant output bit data string (0) into a serial data in sequence as the PtoS shift register output 17c and outputs it. The PtoS shift register output 17c is outputted issued in sequence from the selector 175 as the PWM output 17d which is pulse width modulated by the PWM unit 173.

In FIG. 10, reference numerals 24, 25 and 26 indicated a differential comparators. The data waveforms on the transmission lines 11 and 12 are inputted to these differential comparators 24, 25 and 26.

A + side input terminal and a − side input terminal of the first differential comparator 24 are connected to the BUS+ line 11 and BUS−line 12, respectively. A + side input terminal of the second differential comparator 25 is connected to the BUS+line 11. A + side input terminal of the third differential comparator 26 is connected to the BUS− line 12. To − side input terminals of the second and third differential comparators 25 and 26, a voltage (VDD/2) of the reference voltage 23 which is a half of power supply voltage VDD is inputted. Output signals 241, 251 and 261 of differential comparators 24, 25 and 26 are inputted to a selector 27 as receive data selecting means.

The selector 27 usually outputs the output signal 241 of the first differential comparator 24 to the receive frame decoding circuit 28 which performs as receive data decoding means. When the BUS−line 11 is abnormal, the output signal 251 of the second differential comparator 25 is outputted to the receive frame decoding circuit 28, and when the BUS+ line 12 is abnormal, the output signal 261 of the third differential comparator 26 is outputted to the same. The receive frame decoding circuit 28 performs demodulation of the data received via the first, second and third differential comparators 24, 25 and 26 detecting of receive errors, and the like, and finally stores the processed data in the receive buffer memory 29.

Figure 14:
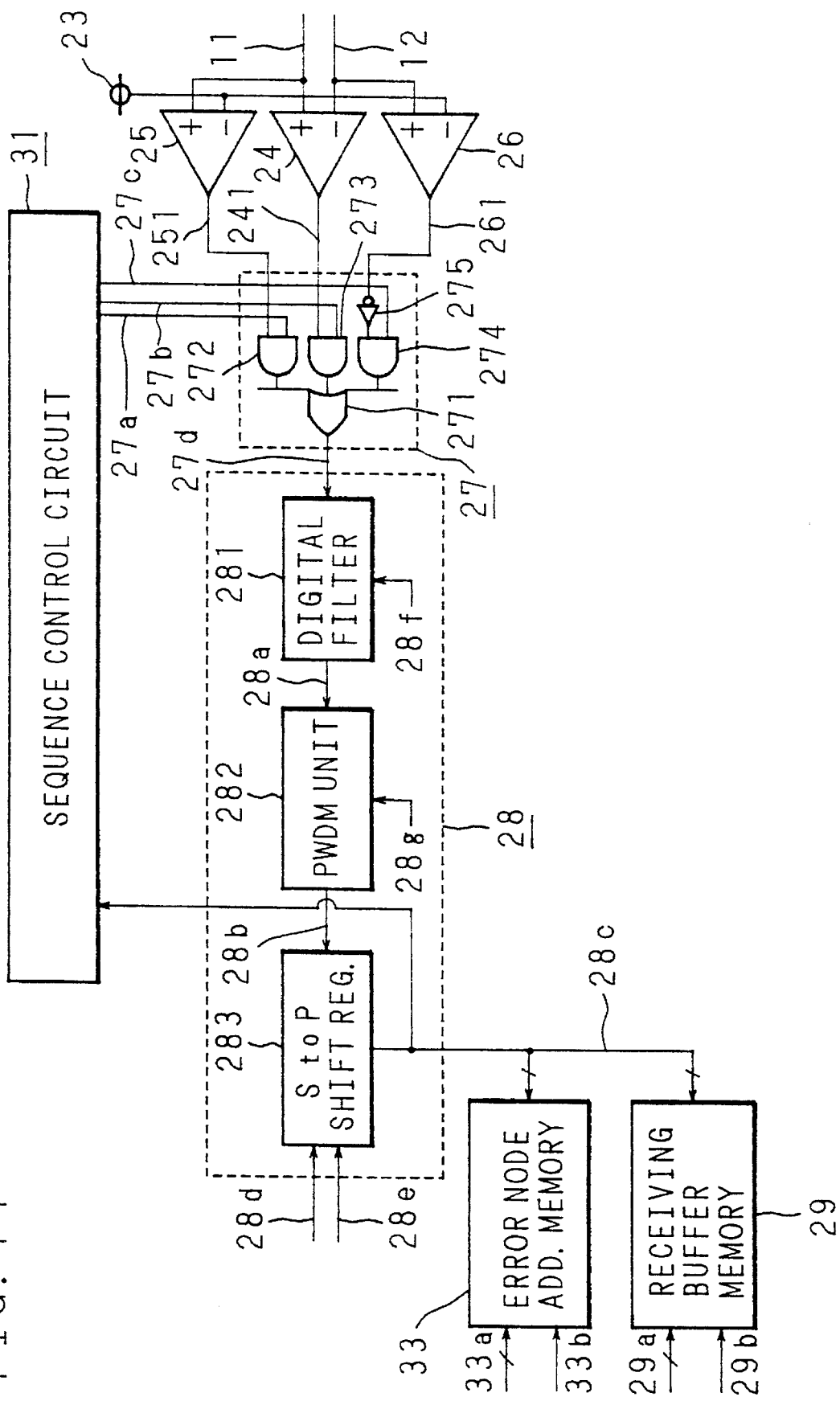
FIG. 14 is a circuit diagram and a block diagram showing a selector and a receive frame decoding circuit and the peripheral devices of the embodiment 1 of the communication controlling apparatus related to the present invention.

Configuration of the selector 27, receive frame decoding circuit 28 and the peripheral devices is described referring to the circuit diagram and block diagram in FIG. 14.

The selector 27 selects among output signals 241, 251 and 261 of differential comparators 24, 25 and 26, respectively, in compliance with a selector control signal 311 (27a, 27b or 27c) given from the sequence control circuit 31 and outputs it as the signal 27d to the receive frame decoding circuit 28.

Concretely, an output signal 251 of the second differential comparator 25 and the selector control signal 27a outputted from the sequence control circuit 31 are inputted to an AND gate 272, an output signal 241 of the first differential comparator 24 and the selector control signal 27b outputted from the sequence control circuit 31 are inputted to an AND gate 273, and a signal obtained by inverting the output signal 261 of the third differential comparator 26 by an inverter 275 and the selector control signal 27c outputted from the sequence control circuit 31 are inputted to the AND gate 274. The output signals of the AND gates 272, 273 and 274 are inputted to an OR gate 271. The output signal of the OR gate 271 is inputted to the receive frame decoding circuit 28 as the output signal 27d of the selector 27.

Reference numeral 281 in a receive frame decoding circuit 28 indicates a digital filter which filters off noise from the output signal 27d of the selector 27. An output signal 28a of the digital filter 281 is inputted to a PWDM unit 282 for pulse width demodulation. Data 28b which is pulse-width demodulated by the PWDM unit 282 is inputted to a StoP shift register 283 for converting to a parallel data and then outputted, as a signal 28c, to an error node address memory 33 performing as the third storing means and the receive buffer memory 29.

When an address input 33a and a write signal 33b are inputted to the error node address memory 33, data 28c already converted to parallel data by the StoP shift register 283 above is stored in the error node address memory 33. When an address input 29a and a write signal 29b are inputted to the receive buffer memory 29, the data 28c already converted to parallel data by the StoP shift register 283 above stated is stored in the receive buffer memory 29.

Next, description will be given on an operation of the receive frame decoding circuit 28 with referring to a timing charts in FIG. 15 and FIG. 16. in addition, the timing charts in FIG. 15 and FIG. 16 should have been drawn in one timing chart.

A BUS+line waveform 111 and BUS−line waveform 121 are inputted to the first differential comparator 24, and a signal 241 is outputted from the first differential comparator 24. The BUS+line waveform 111 and reference voltage 23 are inputted to the second differential comparator 25, and a signal 251 is outputted from the second differential comparator 25. The BUS−line waveform 121 and reference voltage 23 are inputted to the third differential comparator 26, and a signal 261 is outputted from the third differential comparator 26. The output signals 241, 251, and 261 of the differential comparators 24, 25 and 26, respectively, are inputted to the selector 27.

Figure 15:
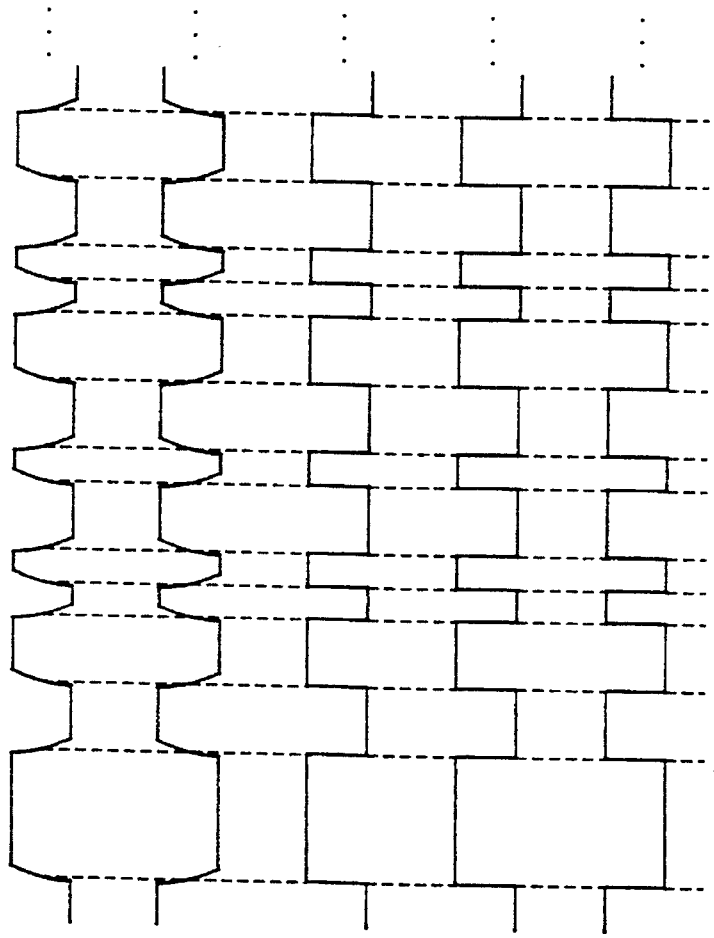
FIG. 15 is a timing chart for explaining the operation of the receive frame decoding circuit of the transmit/receive circuit of the embodiment 1 of the communication controlling apparatus related to the present invention.

Though not shown in FIG. 15, the selector control signal 311 (27a, 27b and 27c) inputted from the sequence control circuit 31 to the selector 27 at this moment are at "L", "H" and "L" levels, respectively, and the selector 27 selects the output signal 241 of the first differential comparator 24 and outputs a signal waveform as shown by the signal 27d to the receive frame decoding circuit 28.

The digital filter 281 filters the output signal 27d of the selector 27 in accordance with the sampling clock pulse 28f to generates a digital filter output signal 28a and inputs it to the PWDM unit 282. The PWDM unit 282 samples the digital filter output signal 28a in accordance with the PWDM sampling clock pulse 28g with the pulse 28h generated by the rising edge of the digital filter output signal 28a as the first Time start pulse, so that when the signal 28a is at the "H" level in the first, second, third and fourth clock pulses and at the "L" level in the fifth and sixth clock pulse+s, the signal 28a given from the digital filter 281 is determined to be the SOF 1. When it is at the "H" level from the next rising edge in the first and second clock pulses and at the "L" level in the third clock pulse, bit "0" is determined. When it is at the "H" level in the first clock pulse and at the "L" level in the second and third clock pulses, bit "1" is determined. The PWDM unit 282 outputs the result of determination to the StoP shift register 283 of the next stage as the demodulated serial data 28b.

Figure 16:
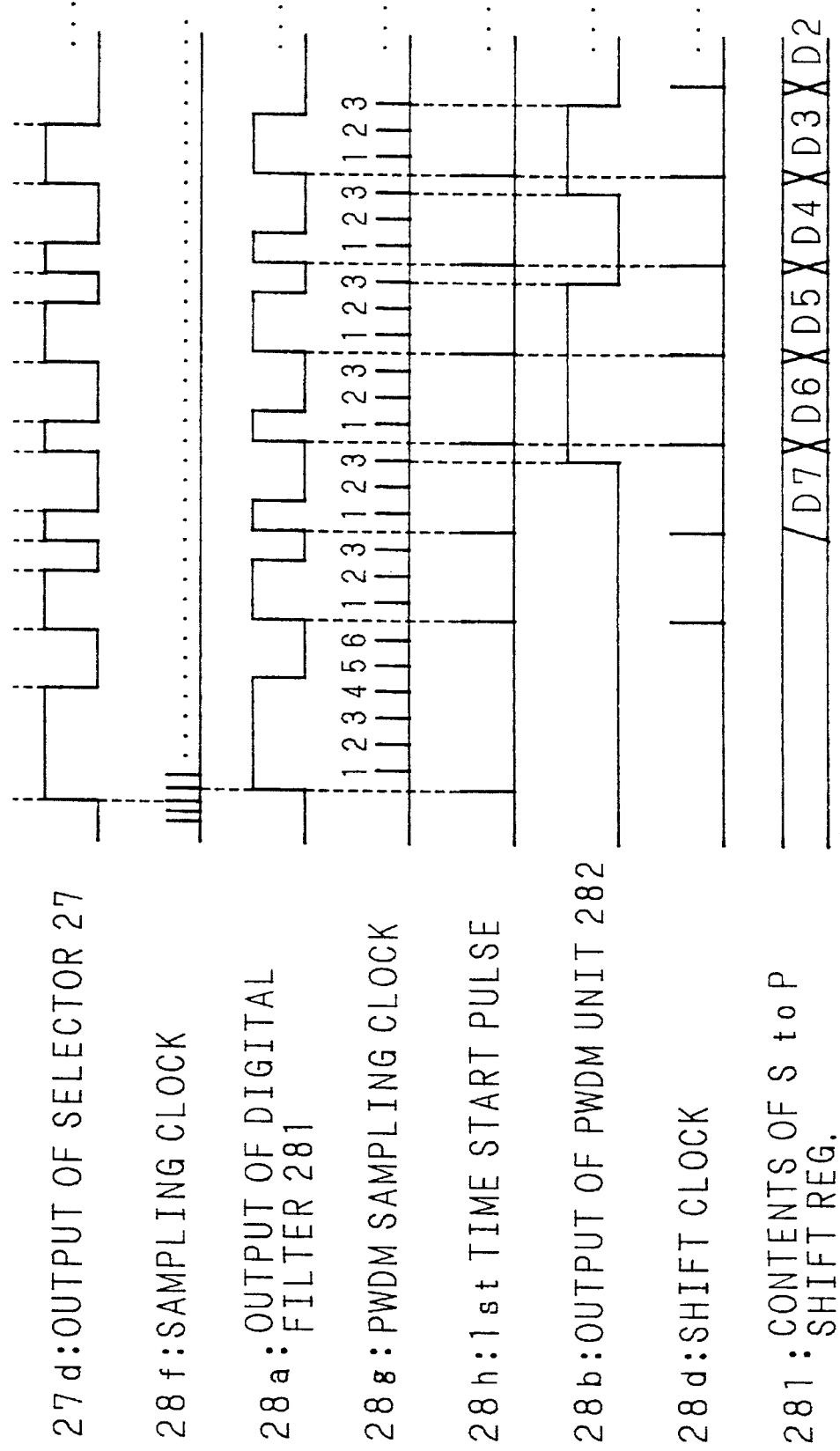
FIG. 16 is a timing chart for explaining an operation of the receive frame decoding circuit of the transmit/receive circuit of the embodiment 1 of the communication controlling apparatus related to the present invention.

The StoP shift register 283 takes in the demodulated serial data 28b outputted from the PWDM unit 282 on the basis of the shift clock 28d and performs data shift as shown by reference numeral 281 in FIG. 16. Reference numeral 281 indicates the contents of the first-stage register in the StoP shift register 283.

Though not shown in the drawing, when 1-byte data is stored in the StoP shift register 283, it is outputted as the parallel data output 28c. When the address 33a and write signal 33b are given to the error node address memory 33, the parallel data 28c outputted from the StoP shift register 283 is stored in the location corresponding to the address 33a of the error node address memory 33. When the address 29a and the write signal 29b are given to the receive buffer memory 29, the parallel data output 28c outputted from the StoP shift register 283 is stored in the location corresponding to the address 29a of the receive buffer memory 29.

In FIG. 10, the signals are inputted to a transmission line error detecting circuit 30 as error detecting means from the BUS+line 11 and BUS−line 12. When either one of the lines is not operating, the transmission line error detecting circuit 30 detects the error and outputs an error signal 30a and 30b to the sequence control circuit 31. The transmission line error detecting circuit 30 determines the errors on the basis of various conditions. But it is not the subject of the present invention and so the explanation is omitted.

When the transmission line error detecting circuit 30 detects an error in the line 11 or line 12, the sequence control circuit 31 disables one of the NAND gate 18 for driving the line 11 or the AND gate 19 for driving the line 12, respectively on which the error is detected. Concretely, the sequence control circuit 31 sets the signal 18a which is inputted to the NAND gate 18 to "L" level to disable and protect the P-channel MOS transistor 20 and sets the signal 19a which is inputted to the AND gate 19 to "L" level to disable and protect the N-channel MOS transistor 21. On the other hand, the selector 27 selects the third comparator 26 or second comparator 25 connected to the BUS+line 11 or BUS−line 12, respectively, wherein no error is detected; thus the system is switched to one-wire communication in which no error is detected.

The sequence control circuit 31 outputs the selector control signal 311 (27a, 27b, 27c), wherein 27b is set to "L" level and either 27a or 27c is set to "H" level, to the selector 27, and then the signal outputted from the third comparator 26 or second comparator 25 is inputted to the receive frame decoding circuit 28 via the selector 27 and thus the receive data is taken in.

The operations of the embodiment 1 of the communication controlling apparatus related to the present invention are described. Different operations from those in the conventional communication controlling apparatuses are performed in the sequence control circuit 31, selector 27, error detecting frame buffer 32 and error node address memory 33 at the time when an error is detected. In the normal conditions wherein no error is detected, the same operations as those in the conventional communication controlling apparatuses are performed. Therefore, explanation for the normal conditions is omitted.

The contents of an error, that is, whether an error is detected or not and whether an error is detected in the line 11 or line 12 detected by the transmission line error detecting circuit 30 are inputted to the sequence control circuit 31 as the error signal 30a and 30b.

An operation performed by sequence control circuit 31 at the time when an error is detected is described referring to FIG. 11. When the error signal 30a or 30b signaling an error detected in the line 11 or line 12 is sent from the transmission line error detecting circuit 30 to the sequence control circuit 31, the circuit 31 generates the transmission start flag 31e, and outputs the transmit data select signal 31a and selector control signal 31b to activate the transmit frame composing circuit 17 for the data already stored in the error detecting frame buffer 32. The sequence control circuit 31 outputs the selector control signal 311 (27a, 27b, 27c) which selects the second comparator 25 or third comparator 26 that is connected to the line wherein no error is detected to the selector 27 shown in FIG. 14.

However, the sequence control circuit 31 controls the NAND gate 18 and AND gate 19 to continue to be enabled at this moment. The transmit frame composing circuit 17 which is activated start to send the message frame 9 shown in FIG. 2 when the transmission line is not busy. Data sent out as the message frame 9 is like the one indicated by reference numeral 32a in FIG. 12. Concretely, the SOF 1 is transmitted and then the priority code 2 is transmitted, the self address data is transmitted as the destination address 3, and the self address data is transmitted again as the self address 4. That is, the transmit frame composing circuit 17 sends out data to itself.

Figure 17:
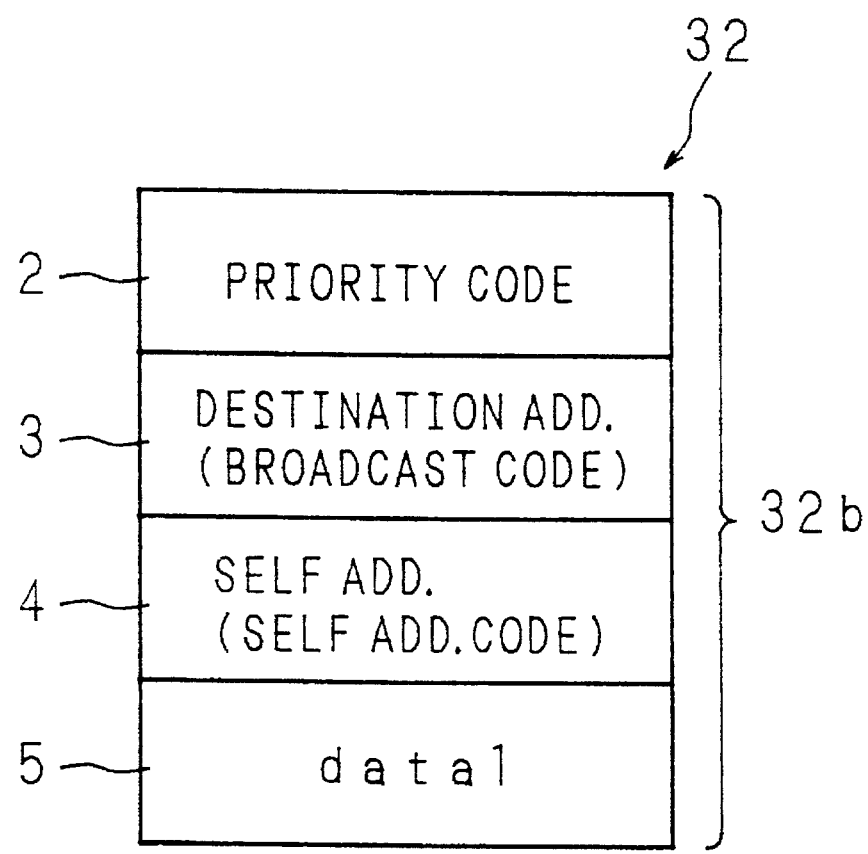
FIG. 17 is a schematic diagram showing an example of data stored in an error detecting frame buffer of the transmit/receive circuit of the embodiment 1 of the communication controlling apparatus related to the present invention.

When a transmission line error is detected again in the message frame 9, the sequence control circuit 31 activates the transmit frame composing circuit 17 again for the data indicated by reference numeral 32b in FIG. 17 already stored in the error detecting frame buffer 32 as well as disables the NAND gate 18 or AND gate 19 that is connected to the transistor driving the line wherein the error is detected.

The transmit frame composing circuit 17 which is activated start to send data in the case where the line is not busy. Data transmitted in this case is in order of the SOF 1, priority code 2, and a broadcast code as the destination address 3 as shown in FIG. 17. The broadcast code is the one which can transmit the same one frame data to all the nodes. In the next step, the node sends the self address 4 and "data 1" as the data area 5 indicating the line wherein an error is detected by the node; in this way, all the other nodes are notified that an error is detected by the node.

Each node which received the broadcast code sent out in the way stated above stores the address of the node wherein the error is detected in the error node address memory 33.

The communication controlling apparatus related to the present invention is further described with reference to FIG. 7 of the schematic diagram showing a state wherein an error has occurred, FIG. 18 of the waveform diagram showing the operations performed in an error node, FIG. 19 of the waveforms showing the operations of the nodes other than error node, and FIG. 20 of the waveform diagram showing the state at receiving operation after finishing the processing.

Figure 7:
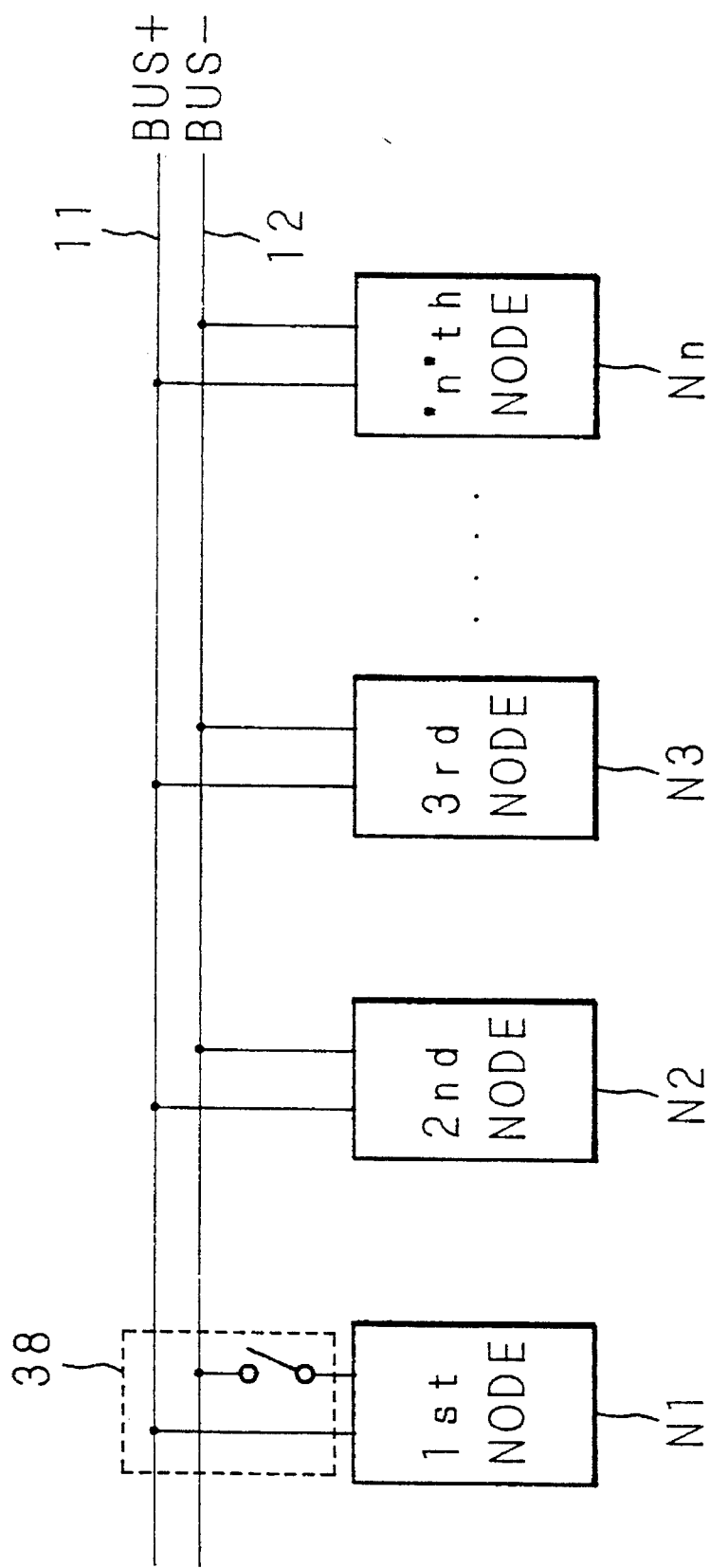
FIG. 7 is a schematic diagram showing a state where a trouble has occurred in a conventional two-wire LAN system and a signal line connecting one of the lines to a node is disconnected.
Figure 8:
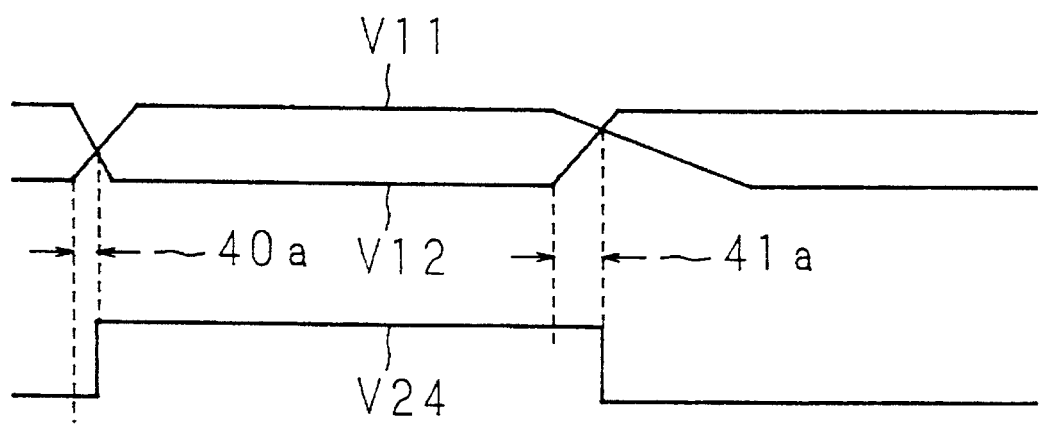
FIG. 8 is a waveform chart showing outline of operations of a first, second and third differential comparators of the communication controlling apparatus of a conventional two-wire LAN system.
Figure 9:
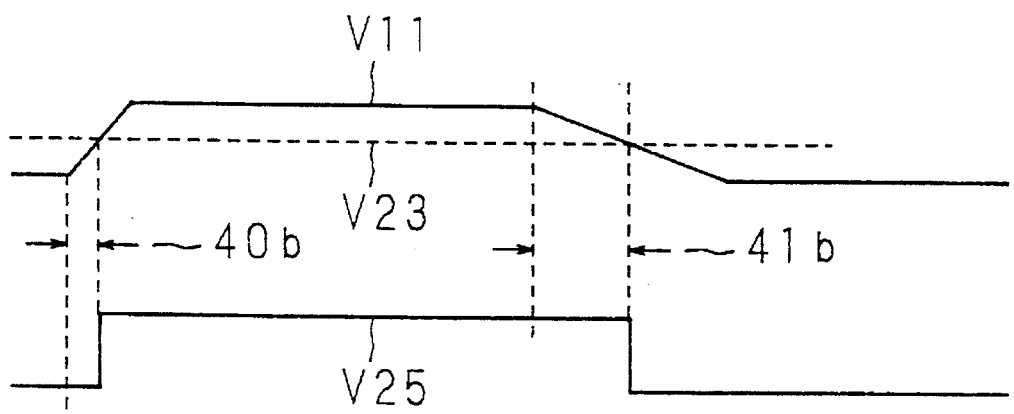
FIG. 9 is a waveform diagram showing a relation between a signal from one of the lines and an output voltage of the second differential comparator in a conventional two-wire LAN system.

FIG. 7 shows that the line connecting the first node N1 to the BUS−line 12 is disconnected.

Figure 18:
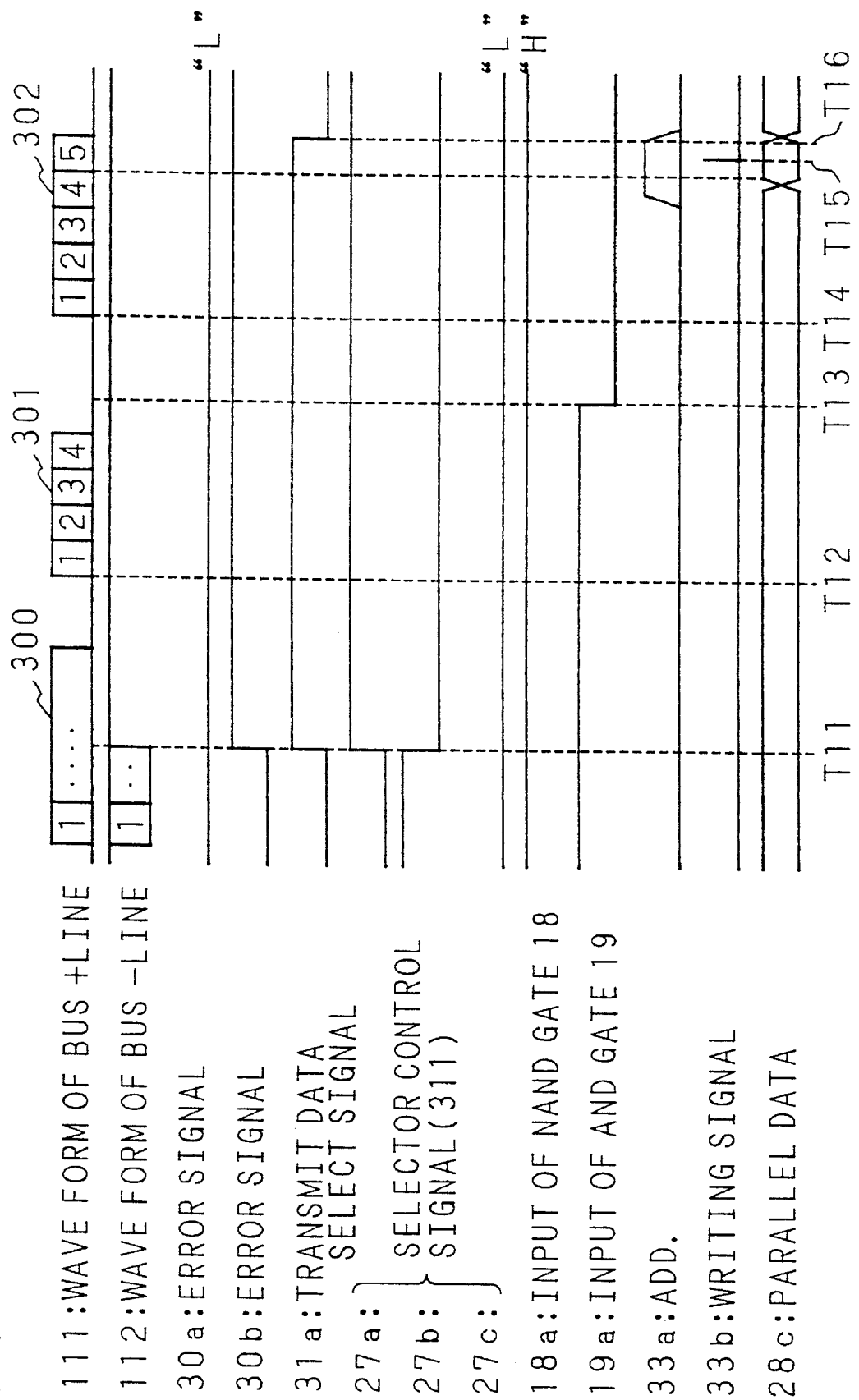
FIG. 18 is a timing chart showing an operation at the time when the embodiment 1 of the communication controlling apparatus related to the present invention becomes an error node (in which an error has occurred)

FIG. 18 shows the timing chart showing an operation of the first node N1 as an error node (which generates a trouble) in a state illustrated in FIG. 7.

In operation of the first node N1 in the case where the BUS−line 12 is disconnected at a timing T11 whereat the first node N1 is sending the frame 300 to the other nodes N2, N3..., as shown in reference numerals 111 and 112 in FIG. 18, are considered.

In this case, the transmission line error detecting circuit 30 detects an error in the BUS−line 12 and gives error signal 30b of "H" level to the sequence control circuit 31, since no error has occurred in the BUS+line 11, the error signal 30a keeps "L" level. In response to this situation, the sequence control circuit 31 gives a transmit data select signal 31a of "H" level to the transmit data selector 171 in the transmit frame composing circuit 17 shown in FIG. 12, thus the data stored in the error detecting frame buffer 32 is selected as transmit data.

The sequence control circuit 31 gives the selector control signal 311 (27a, 27b, 27c), wherein the signal 27a becomes "H" level and the signal 27b becomes "L" level, to the selector 27 shown in FIG. 14. Thus the selector 27 selects the output signal 251, as the receive data, of the second differential comparator 25 instead of the output signal 241 of the first differential comparator 24. The sequence control circuit 31 makes the transmit frame composing circuit 17 compose the transmit frame 10 for the data 32a shown in FIG. 12 stored in the error detecting frame buffer 32 and sends out it at a timing T12.

Figure 1:
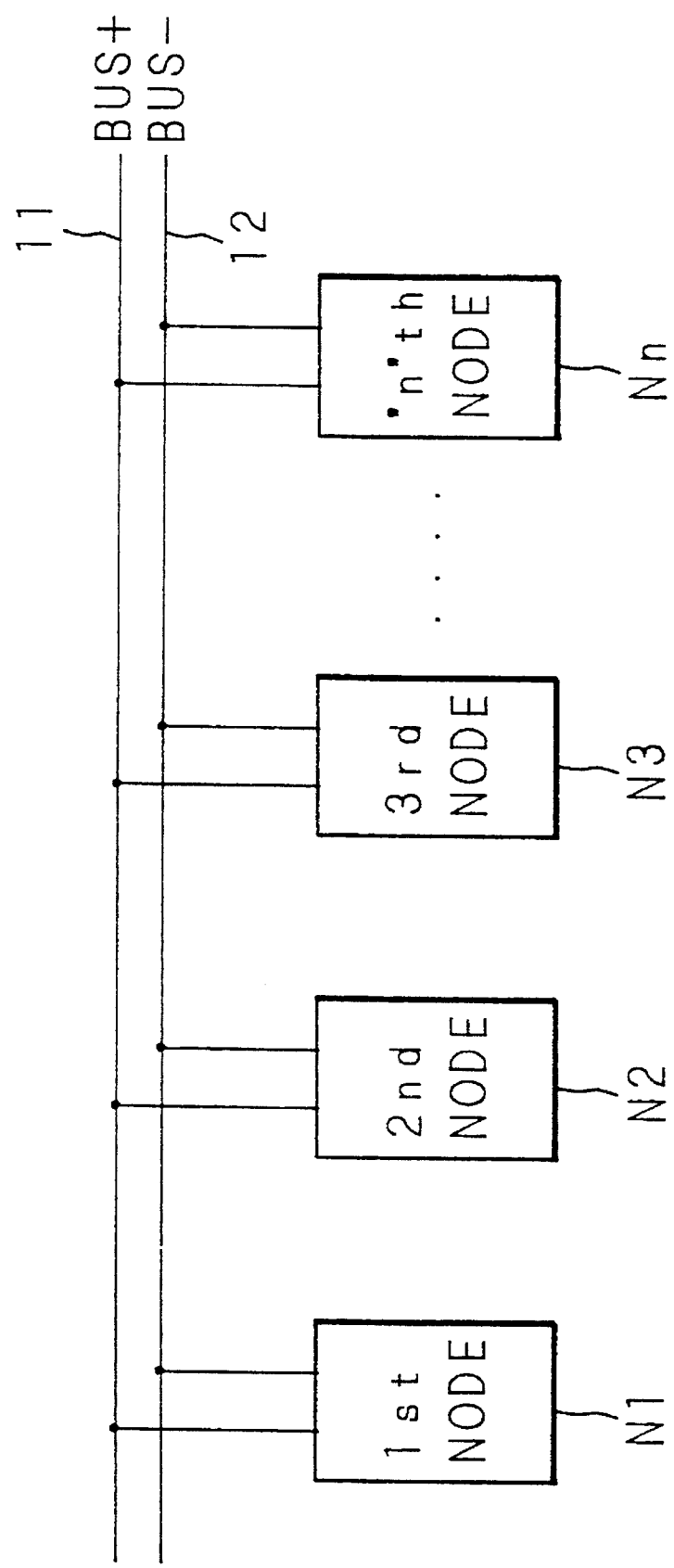
FIG. 1 is a schematic diagram showing two lines of the conventional two-wire LAN system and a plurality of nodes connected thereto.
Figure 2:
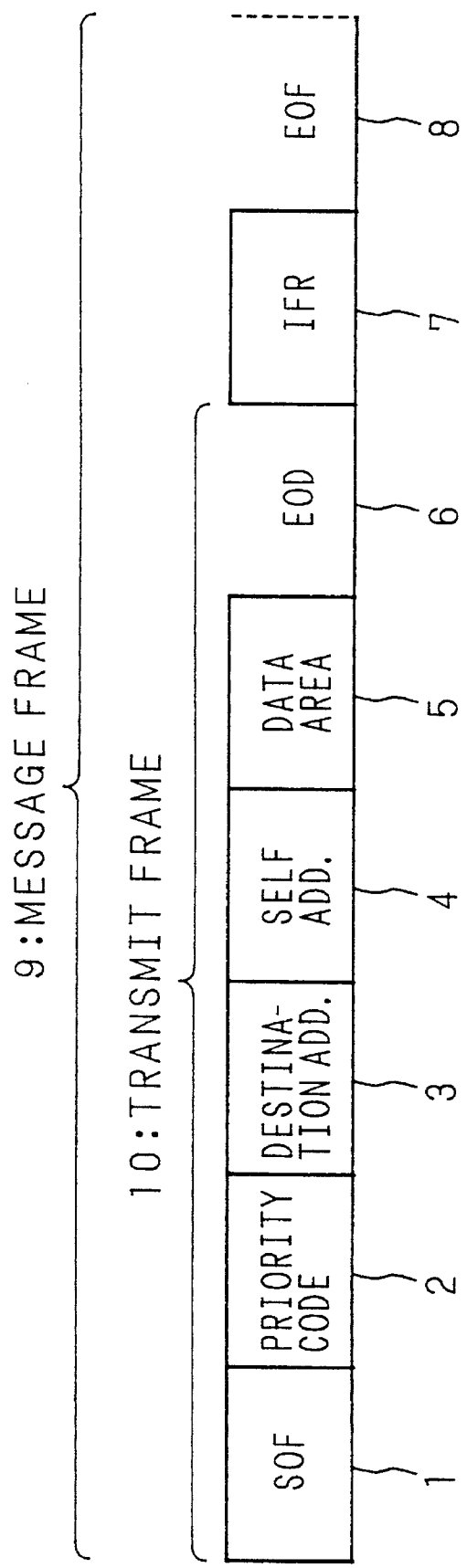
FIG. 2 is a schematic diagram showing a configuration of a message frame designated as "Class B data communication network interface J1850" which is used in the conventional two-wire LAN systems.

As described above, contents of the transmit data 32a stored in the error detecting frame buffer 32 is transmitted according to the frame format shown in FIG. 2. In this case, the frame 10, whose format is that the self address (the address of the first node N1) is set in the second byte as the destination address 3 and the self address (the address of the first node N1) is set in the third byte as the self address 4, is sent to the transmission line. That is, the first node N1 sends data to itself.

In FIG. 18, a data waveform of a frame 301 sent out the first node N1 is transmitted only to the BUS+line 11 even when the P-channel MOS transistor 20 and N-channel MOS transistor 21 are in the operation state because the line connecting to the BUS−line 12 is disconnected as shown in FIG. 7, so that the BUS−line 12 becomes non-operation state. Consequently, in the first node N1, the error signal 30b of the BUS−line 12 is kept at "H" level, that is, condition in which a BUS error is detected is continued. At a timing T13 whereat sending out of the frame 301 has finished and the error signal 30b keeps "H" level, the input signal 19a from the sequence control circuit 31 to the AND gate 19 of the first node N1 becomes "L" level and then the N-channel MOS transistor 21 driving the BUS–line 12 becomes in always OFF state. In this way, the transmission line error detecting circuit 30 detects that a trouble has occurs in the relation between the first node N1 and BUS–line 12. The first node N1 composes the transmit frame 10 in the transmit frame composing circuit 17 for the data 32b shown in FIG. 17 stored in the error detecting frame buffer 32 and sends it at a timing T14 in order to inform the other nodes N2, N3 . . . that it has detected an error in the BUS–line 12.

In this case, the N-channel MOS transistor 21 driving the BUS–line 12 is turned off, therefore a data waveform is sent only to the BUS+line 11. Data contents of a frame 302 to be sent out is sent out according to a format shown in FIG. 2. The first node N1 sets the broadcast code in the first node N1 as the destination address 3 located in the third byte, the self address (the address of the first node N1) as the self address 4 located in the fourth byte, the data indicating that an error is detected in the BUS–line 12 is set in the data area 5 located in the fifth byte respectively in the frame format, and sends out it with use of the broadcasting to all the nodes.

In FIG. 18, reference numerals 33a, 33b and 28c indicate the internal timing signals in nodes N2, N3 . . . , respectively, other than the first node N1.

When the nodes N2, N3 . . . other than the first node N1 receive the frame 302 stated above from the first node N1, the node N2, N3 . . . store a parallel data 28c indicating the first node N1 together with a code indicating that an error has occurred in the BUS–line 12 at a timing T15 in the address 33a of the error node address memory 33 in response to the write signal 33b. That is, the data indicating that the first node N1 has detected an occurrence of error in the BUS–line 12 is stored in the error node address memory 33 of each of the nodes N2, N3 . . . other than the first node N1.

At a timing T16 following the timing T15, the first node N1 becomes in a state in which the data stored in the transmit buffer memory 16 to be used for ordinary communication is selected because the transmit data select signal 31a changes to "L" level.

Figure 19:
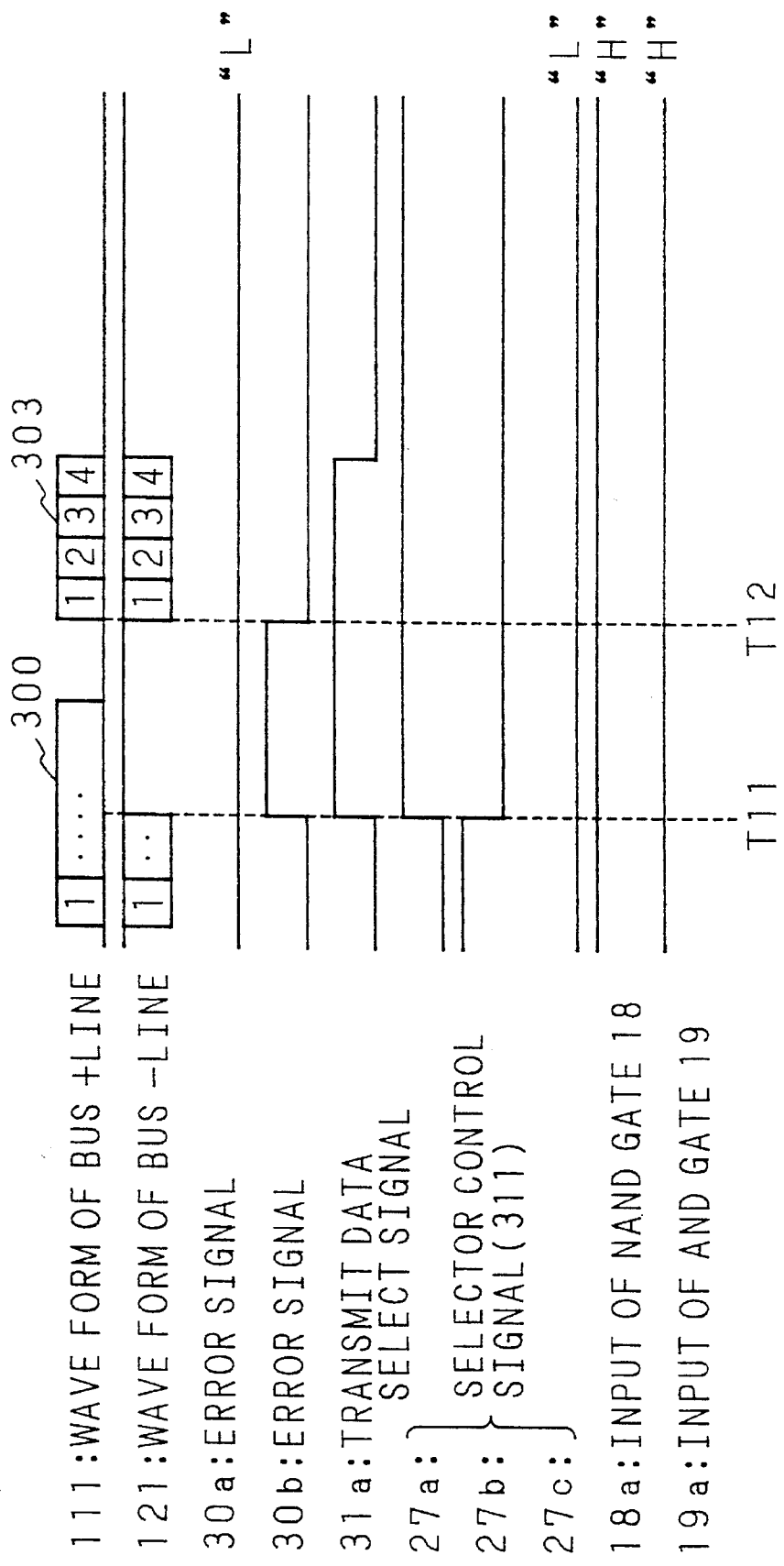
FIG. 19 is a timing chart showing an operation at the time when the transmit/receive circuit of embodiment 1 of the communication controlling apparatus related to the present invention becomes a node other than error node (in which an error has occurred)

Next, with reference to FIG. 19, an operation performed in the nodes N2, N3 . . . other than the first node N1, that is, operation in the node other than the error node is described. In other words, the operation performed in the nodes N2, N3 . . . other than the first node N1 wherein the trouble shown in FIG. 7 has occurred at the timing T11 while they are receiving signals sent from the first node N1 are explained.

When the frame 300 shown in FIG. 18 is inputted, as shown by reference numerals 111 and 112, each nodes N2, N3 . . . other than the first node N1 which is an error node makes the error signal 30b be "H" level and outputs is to the sequence control circuit 31 at the timing T11 as same as the first node N1 does. In response to the signal, the sequence control circuit 31 makes the transmit data select signal 31a be "H" level and outputs it to the transmit data selector 171 in the transmit frame composing circuit 17 to select the data to be transmitted stored in the error detecting frame buffer 32.

The sequence control circuit 31 makes the signal 27a from "L" level to "H" level and the signal 27b from "H" level to "L" level with the selector control signal 311 (27a, 27b, 27c) to select the output signal 251 of the second differential comparator 25 instead of the output signal 241 of the first differential comparator 24 as the receive data. The sequence control circuit 31 makes the transmit frame composing circuit 17 compose the transmit frame 10 for the data 32a shown in FIG. 12 stored in the error detecting frame buffer 32 and sends it at the timing T12 as the frame 303.

The operation hitherto performed is same as those performed in the first node N1 which is the error node.

Since the BUS–line 12 disconnects in only the first node N1, as shown in FIG. 7, the frame 303 outputted from the transmit frame composing circuit 17 of each of the nodes N2, N3 . . . other than N1 which is abovementioned error node is transmitted in a state where both the BUS+line 11 and BUS–line 12 are operating as shown by reference numerals 111 and 112 shown in FIG. 19. In this case, in each node N2, N3 . . . , the error signal 30b outputted from the transmission line error detecting circuit 30 to the sequence control circuit 31 changes to "L" level from "H" level, therefore error detection for the BUS–line 12 is released.

In each nodes N2, N3 . . . , after the frame 303 above stated is sent out, the transmit start flag 31e becomes in "L" level and the transmit buffer memory 16 which is used for the ordinary communication is selected. The input signals 18a and 19a from the sequence control circuit 31 to the NAND gate 18 and AND gate 19, respectively, are kept in "L" level and the P-channel MOS transistor 20 driving the BUS+line 11 and the N-channel MOS transistor 21 driving the BUS–line 12 are kept in the operable state. However, the state where the output signal of the second differential comparator 25 is selected is preserved.

Figure 20:
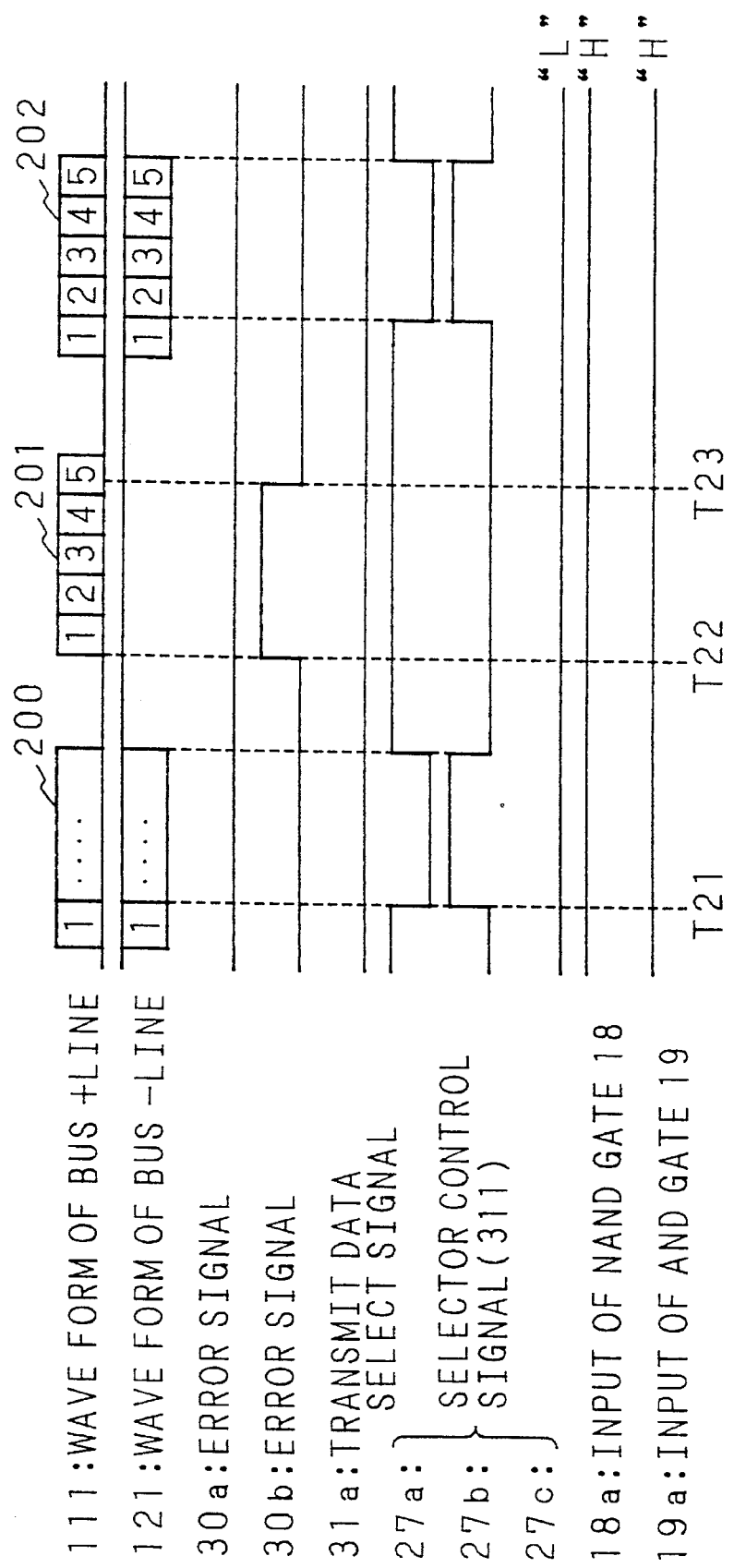
FIG. 20 is a timing chart showing the operation in the case where the normal communication resumes after the transmit/receive circuit of the embodiment 1 of the communication controlling apparatus related to the present invention has terminated operations illustrated in FIG. 18 and FIG. 19.

Next, referring to FIG. 20, an operation at the time when the ordinary communication is resumed after each nodes N2, N3 . . . including the first node N1 have terminated operation illustrated in FIG. 18 and FIG. 19.

In FIG. 20, an operation of each nodes N2, N3 . . . other than the first node N1 is described. Reference numeral 200 annexed to the signal waveform 111 in the BUS+line 11 indicates a frame sent out by the nodes N2, N3 ... other than the first node N1.

In the SOF 1 period, the nodes N2, N3 . . . makes the signal 27a among the selector control signal 311 (27a, 27b, 27c) outputted to the selector 27 as shown in FIG. 19 be "H" level to select the output signal 251 of the second differential comparator 25. In the periods errors are not detected in both the BUS+line 11 and BUS–line 12 as obvious from the states of the error signals 30a and 30b, therefore each nodes N2, N3 . . . makes the signal 27a be in "H" level from "H" level and makes the signal 27b be in "H" level from "L" level among the selector control signal 311 (27a, 27b, 27c) at a timing T21 whereat the SOF 1 is received, to select the output signal 241 from the first differential comparator 24 as following received data. That is, in the SOF 1 period of a frame200, each node N2, N3 . . . performs receiving processing of the output signal 251 of the second differential comparator 25 which operates only by the BUS+line 11, and then performs receiving processing of the output signal 241 of the first differential comparator 24 which operates by both the BUS+line 11 and BUS–line 12.

The system returns to the normal data receiving state at the time when the receiving processing of the frame 200 finishes between the timing T21 and T22; therefore the signals 27a and 27b among the selector control signal 311 becomes in "L" Level and "H" level, respectively.

A case wherein the first node N1 sends out the transmit frame 201 is described.

In the first nod eN1, since the N-channel MOS transistor 21 driving the BUS–line 12 is in the off-state as stated above, the transmit frame is sent only to the BUS+line 11. Consequently, each node N2, N3 . . . detects an error in the BUS–line 12 at the timing T22 and makes the error signal 30b in "H" level. in each node N2, N3 . . . , the selector control signal 27a is kept in "H" level after reception of the SOF 1, and then receiving processing of the output signal 251 of the second differential comparator 25 operated by the BUS+line 11 is performed. At this stage, each the node N2, N3 . . . receives the third byte of the transmit frame 201. It is the address of the first node N1. Each node N2, N3 . . . compares the received third byte with the error node address (the address of the first node N1 in this case) received in the frame 302 stated above and stored in the error node address memory 33 and the error contents (error in the BUS–line 12 in this case); and when they coincide, each node N2, N3 ... does not perform operation for the time when an error has occurred as described in FIG. 18 and FIG. 19 but makes the error signal 30b in "L" level for indicating error detection in the BUS–line 12.

Concerning the frame sent from the first node N1, each node N2, N3 . . . performs receiving processing only by the BUS–line 12, and even when an error is detected in the BUS–line 12, each node N2, N2 . . . does processing in which the transmit frame is sent to itself to confirm the error as illustrated in FIG. 18 and FIG. 19.

In addition, concerning the frame 202 sent from the nodes N2, N3 . . . other than the first node N1, receiving processing is performed in the same way as for the frame 200.

Since the system returns to the normal data receiving state at the completion of receiving processing of the frame 202 after the timing T23, the signals 27a and 27b among the selector control signal 311 becomes "L" level and "H" level, respectively.

[Embodiment 2]

Figure 21:
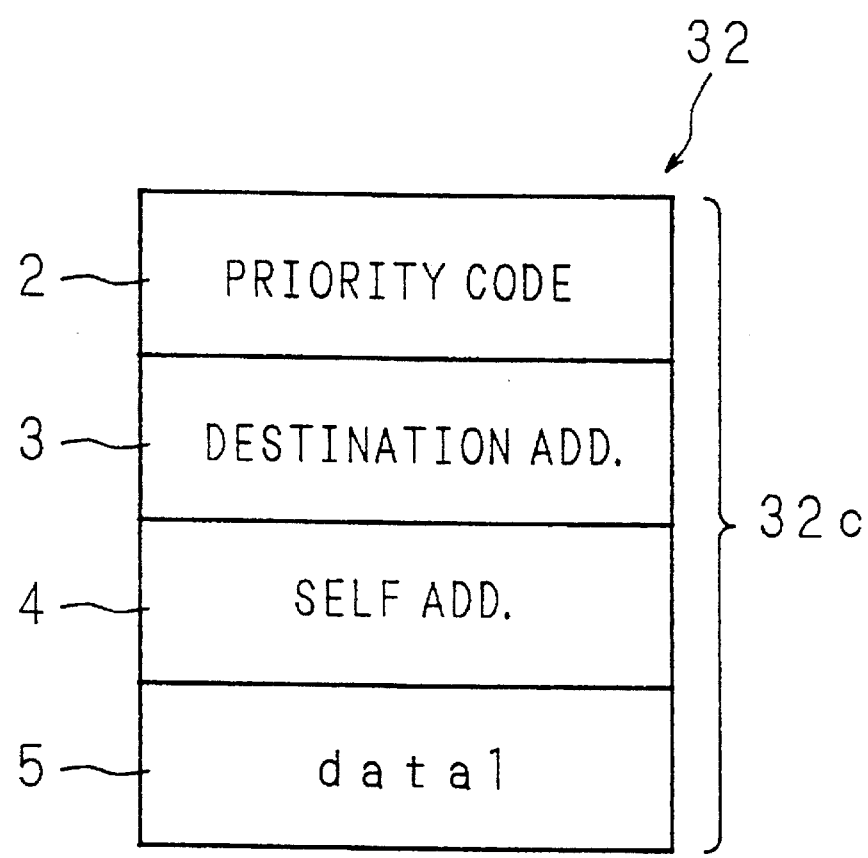
FIG. 21 is a schematic diagram showing an example of data stored in the error detecting frame buffer of the transmit/receive circuit of an embodiment 2 of the communication controlling apparatus related to the present invention.

In the embodiment 1 abovementioned, whether an error is detected or not in own node is made known to the other nodes by broadcast communication. In a system without the broadcast communication function, the same effect can be obtained by transferring whether the error is detected or not in own node to all the other nodes by using the error detecting frame buffer 32c shown in FIG. 21, the result is same.

The error detecting frame buffer 32 is incorporated in the communication controlling apparatus in the above example, however, data can also be transferred by writing the same contents in the transmit buffer memory 16 by means of a microcomputer controlling the communication controlling apparatus.

[Embodiment 3]

The communication controlling apparatus related to the above embodiment 1 has the error node address memory 33; wherein the first node N1 which has detected an error composes a transmit frame indicating that the error is detected and sends it to the other nodes. However, the same results are finally obtained in the case where the other nodes which have detected no errors compose the transmit frames indicating that no errors is detected and send them, the addresses of these nodes are stored in the normal node address memory 330 shown in FIG. 22 and FIG. 23 instead of the error node address memory 33 shown in FIG. 10 and FIG. 14, and operations are performed in accordance with the descriptions of embodiment 1 abovedescribed.

Figure 22:
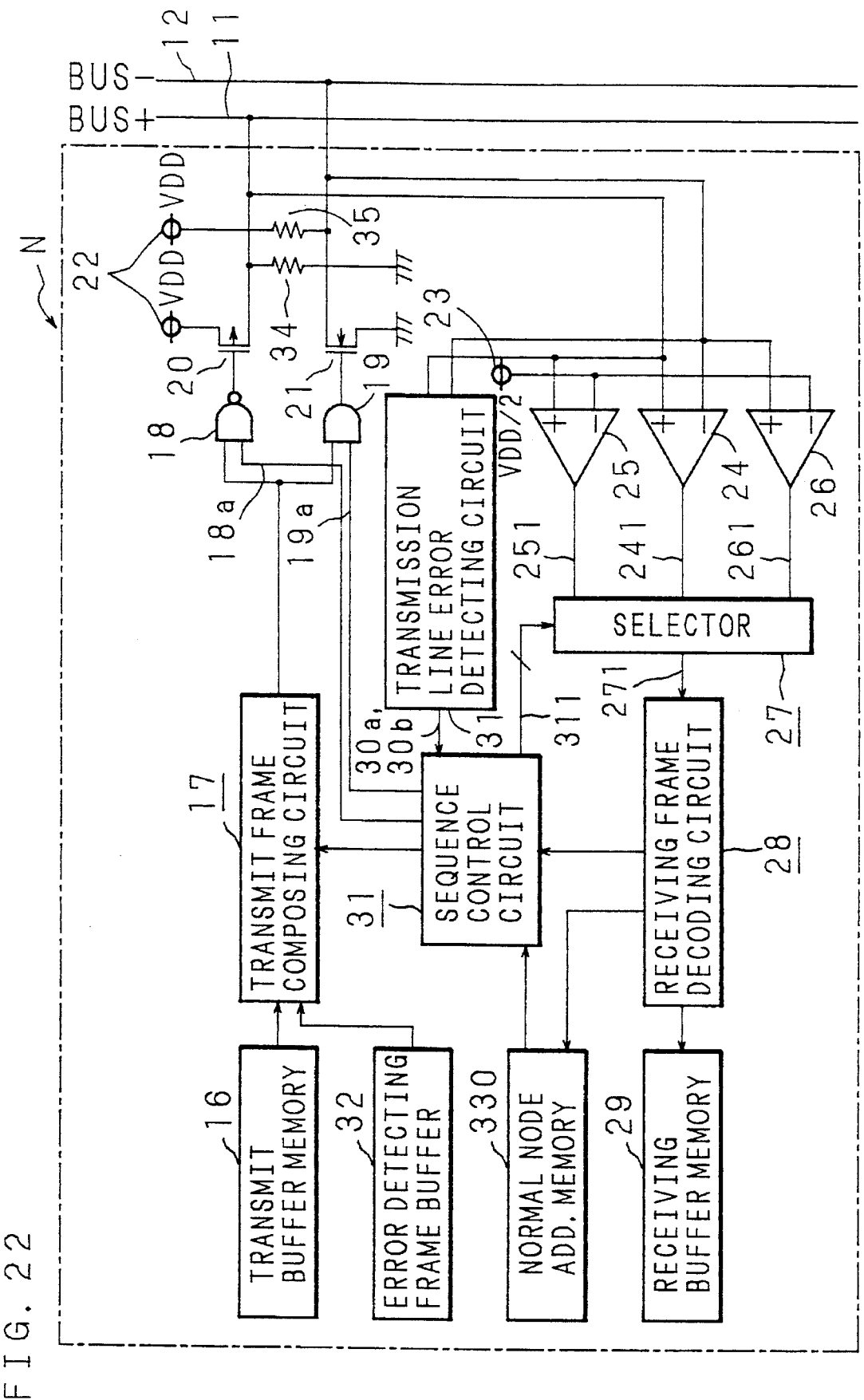
FIG. 22 is a block diagram showing an example of configuration of the transmit/receive circuit of an embodiment 3 of the communication controlling apparatus related to the present invention.
Figure 23:
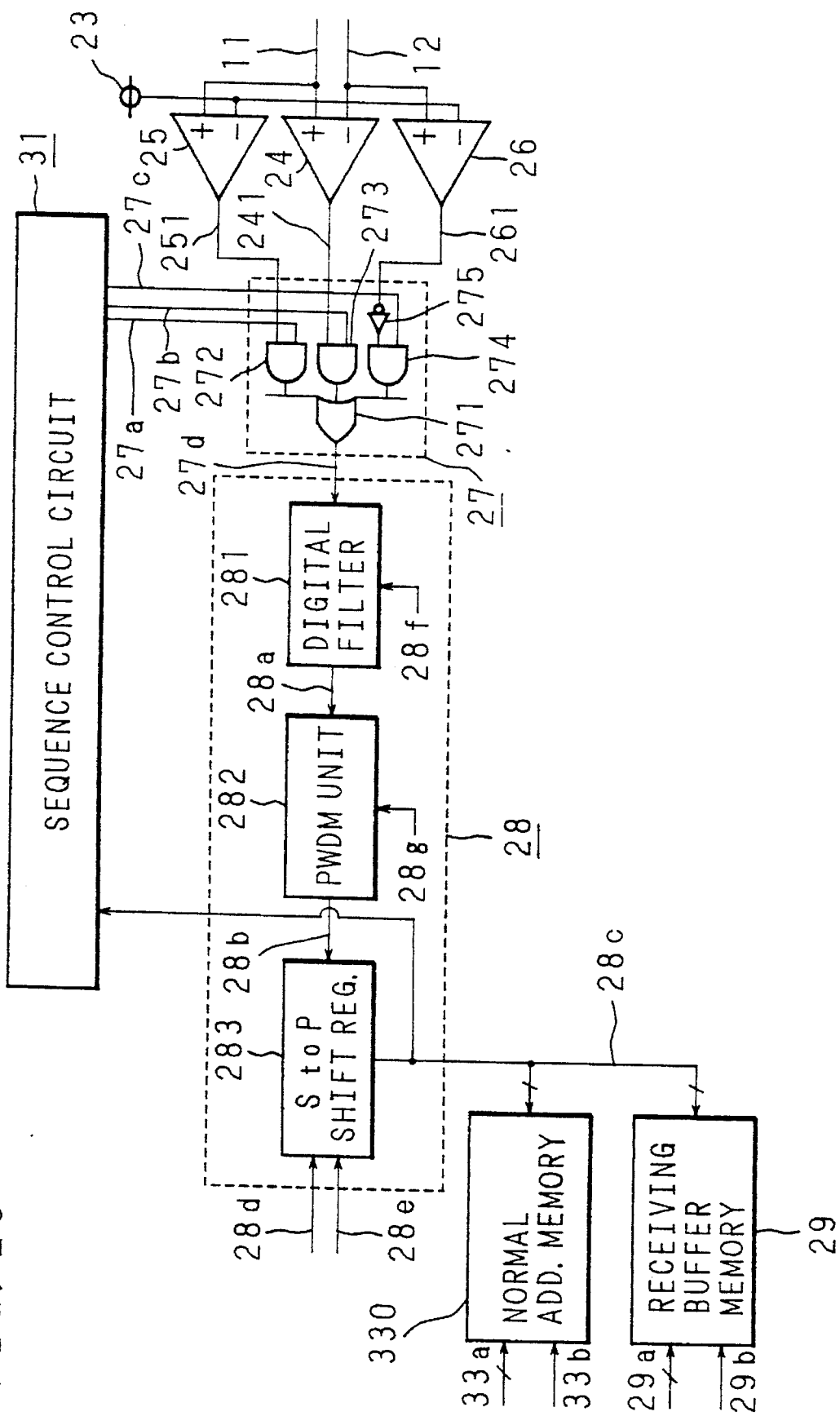
FIG. 23 is a block diagram showing a configurations of the selector and receive frame decoding circuit of the transmit/receive circuit of an embodiment 3 of the communication controlling apparatus related to the present invention.

FIG. 22 is a block diagram showing a configuration of a transmit/receive circuit of the communication controlling apparatus of embodiment 3 of the present invention. FIG. 23 is a block diagram showing a configuration of its selector 27 and the receive frame decoding circuit 28.

Concrete descriptions are given referring to FIG. 22 and FIG. 23, FIG. 7: of the schematic diagram showing the state wherein an error has occurred, FIG. 18: of the waveform diagram showing the operating state in the error node, and FIG. 24: of the waveform diagram showing the operating state of the nodes other than the error node, as follows.

FIG. 7 shows an example of a trouble condition in which the line connecting the first node N1 to the BUS–line 12 is disconnected while the first node N1 is sending a data to other nodes.

In FIG. 18, the operation of the first node N1 is studied in the case where the BUS–line 12 is disconnected at the timing T11 whereat the first node N1 is sending a frame 300 to the other nodes N2, N3 . . . as shown by reference numerals 111 and 112 in FIG. 18.

In this case, the transmission line error detecting circuit 30 of the first node N1 detects an error in the BUS–line 12 and makes the error signal 30b in "H" level and gives it to the sequence control circuit 31. In addition, the error signal 30b keeps in "L" level because no error has occurred in the BUS+line 11. In response to this, the sequence control circuit 31 makes the transmit data select signal 31a in "H" level and gives it to the transmit data selector 171 of the transmit frame composing circuit 17 to select the data stored in the error detecting frame buffer 32 as the transmit data.

The sequence control circuit 31 makes the signal 27a in "H" level from "L" level and makes the signal 27b in "L" level from "H" level among the selector control signal 311 (27a, 27b, 27c) to the selector 27 to select the output signal 251 of the second differential comparator 25 instead of the output signal 241 of the first differential comparator 24 as the receive data. The sequence control circuit 31 composes the transmit frame 10 in the transmit frame composing circuit 17 for the data 32a shown in FIG. 12 stored in the error detecting frame buffer 32 and sends it at a timing T12.

Contents of the transmit data 32a stored in the error detecting frame buffer 32 is sent out according to the frame format shown in FIG. 2. In this case, the frame 10, wherein the self address (the address of the first node N1) is set as the destination address 3 located in the second byte and the self address (the address of the first node N1) is set as the self address 4 located in the third byte of the frame format, is sent to the transmission line. That is, the first node N1 sends data to itself.

Figure 24:
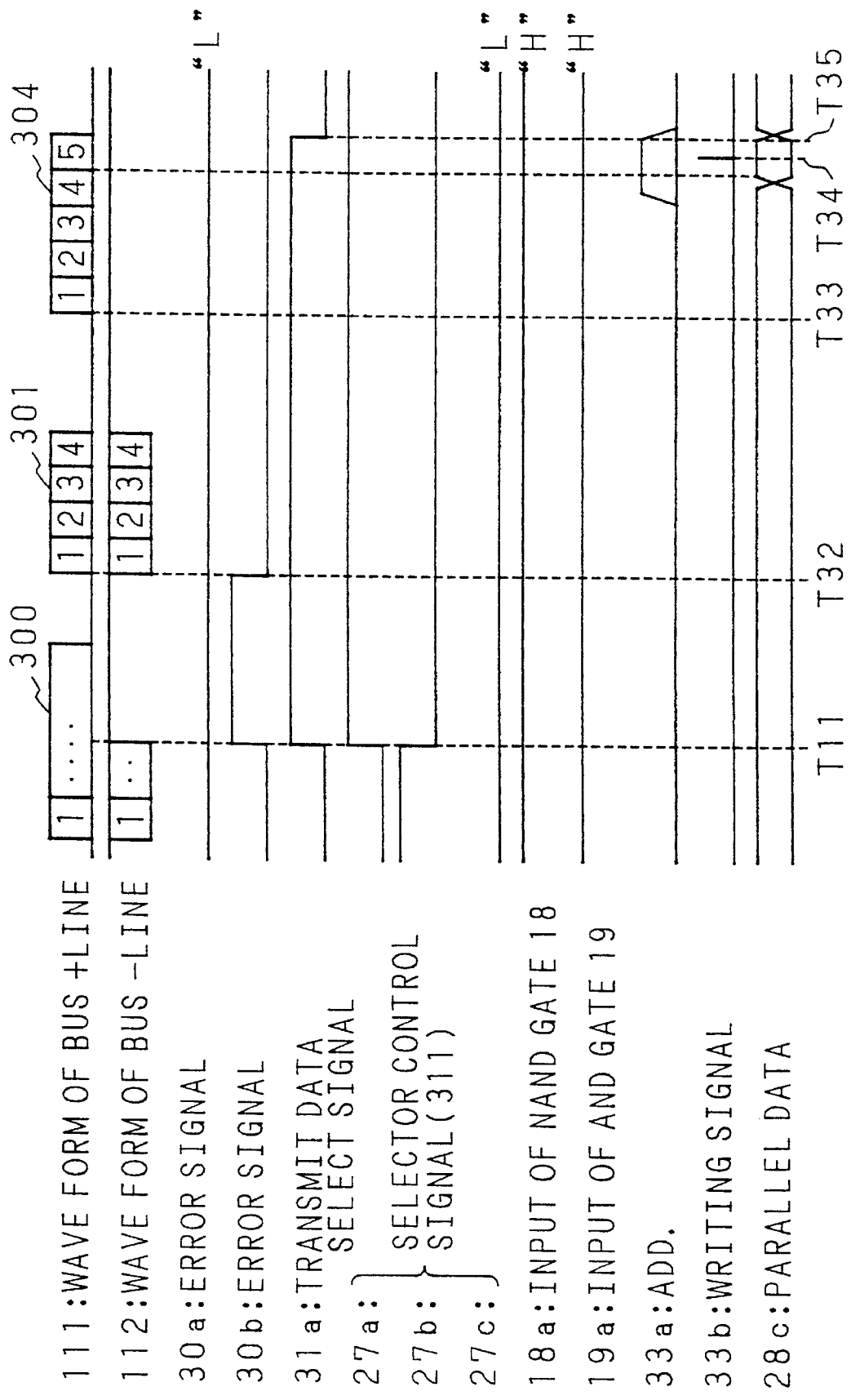
FIG. 24 is a timing chart showing an operation of the case where the transmit/receive circuit of the embodiment 3 of the communication controlling apparatus related to the present invention becomes a node other than an error node (in which an error has occurred)

Data waveform of the frame 301 shown in FIG. 24 outputted from the first node N1 is transmitted to both the BUS+line 11 and BUS–line 12 in the node which detects an error other than the first node N1. Since both the BUS+line 11 and BUS–line 12 are operating, the error signal 30b of the BUS–line 12 becomes in "L" level at a timing T32 as the error detection is released. Each node N2, N3 . . . other than the first node N1 compose the transmit frame 10 at a timing T33 in the transmit frame composing circuit 17 for the data 32b shown in FIG. 17 stored in the error detecting frame buffer 32 in order to inform the other nodes that an error is not detected in the BUS–line 12.

Data contents of frame 304 sent out from the nodes N2, N3 . . . other than the first node N1 is sent out according to the frame format shown in FIG. 2. In the frame 304, the broadcast code as the destination address 3 located in the second byte, the self address (the address of the first node N1) as the self address 4 located in the third byte, and the data indicating that error is not detected in the BUS–line 12 in the data area 5 located in the fourth byte of the frame format, and it is then sent out to all the nodes by broadcast communication.

Reference numerals 33a, 33b and 28c in FIG. 24 indicate the internal timing signals of the other nodes which have received the frame 304.

When all the other nodes receive the frame 304 stated above, they store a parallel data 28c indicating the transmit node and a code indicating that error is not detected in address 33a in the normal node address memory 330 at a timing T34 in response to the write signal 33b.

In a node (transmit node) which has sent a frame indicating that it has detected no error, the transmit data select signal 31a becomes in "L" level at the subsequent timing T35 and thus becomes ready to select the data in the transmit buffer memory 16 to be used for the ordinary communication.

[Embodiment 4]

In the above described embodiment 1, the data 32a and 32b stored in the error detecting frame buffer 32 shown in FIG. 12 and FIG. 17 are used. The same affects can be obtained in the case where the data indicating whether an error is detected or not is sent to all the nodes by one transmission with use of only the the frame 32b shown in FIG. 27 for broadcast communication, when own node detects an error in its SOF 1 period, transmitting the priority code 2, the broadcast code as the destination address 3, the self address 4, and the data indicating that an error is detected in the "data 1" as the data area 5, or when own node detects no error in its SOF 1 period, transmitting the priority code 2, the broadcast code as the destination address 3, the self address 4, and the code indicating no error is detected in the "data 1" as the data area 5.

The embodiment 4 of the communication controlling apparatus related to the present invention is concretely explained with reference to the drawings.

Figure 25:
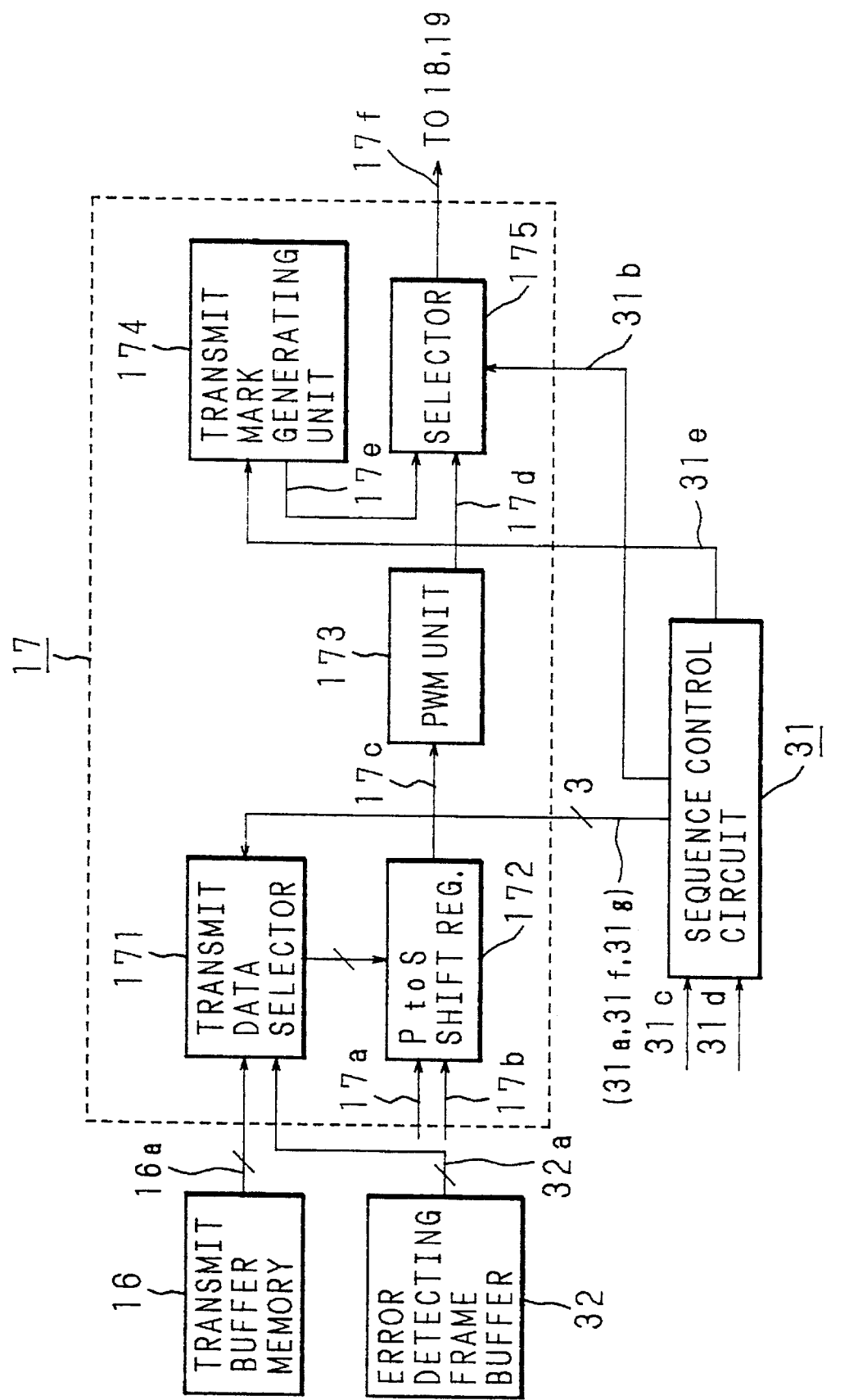
FIG. 25 is a block diagram showing a configuration of a transmit frame composing circuit of the transmit/receive circuit and the peripheral devices such as a transmit buffer memory, an error detecting frame buffer and a sequence control circuit of an embodiment 4 of the communication controlling apparatus related to the present invention.
Figure 26:
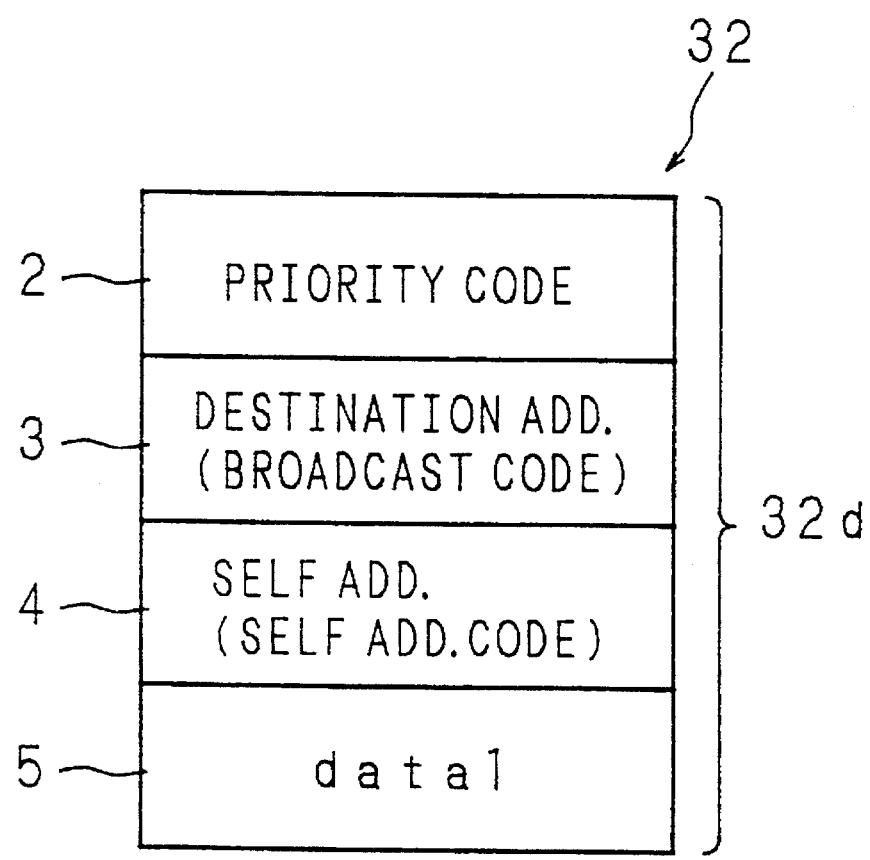
FIG. 26 is a schematic diagram showing a data to be transmitted at the time when an error has been detected, stored in the error detecting frame buffer of the transmit/receive circuit of the embodiment 4 of the communication controlling apparatus related to the present invention.
Figure 27:
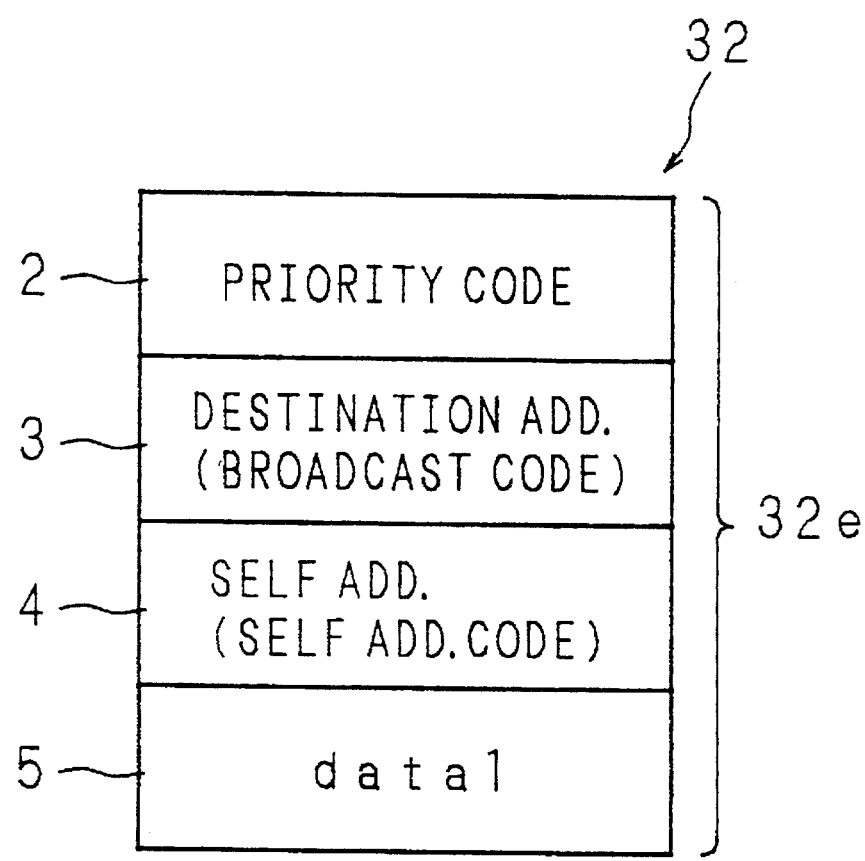
FIG. 27 is a schematic diagram showing a data to be transmitted at the time when no error has been detected, stored in the error detecting frame buffer of the transmit/receive circuit of the embodiment 4 of the communication controlling apparatus related to the present invention.

FIG. 25 is a block diagram showing the configuration of the transmit frame composing circuit 17 and its peripheral devices such as the transmit buffer memory 16, error detecting frame buffer 32, and sequence control circuit 31. FIG. 26 is a schematic diagram of the data 32d to be transmitted when an error is detected, and stored in the error detecting frame buffer 32 of the embodiment 4. FIG. 27 is a schematic diagram of the data 32e to be transmitted when no error is detected, and stored in the error detecting frame buffer 32 of the embodiment 4.

In FIG. 25, the different point from FIG. 11 showing the block diagram of the above embodiment 1 is that the sequence control circuit 31 gives transmit data select signals 31f and 31g in addition to the transmit data select signal 31a to the transmit data selector 171. The transmit data select signal 31f becomes in "H" level when an error is detected. In response to this, the transmit data selector 171 selects the data 32d shown in FIG. 26 as a transmit data and outputs it to the PtoS shift register 172. On the other hand, the transmit data select signal 31g goes high when no error is detected. This makes the transmit data selector 171 select the data 32e shown in FIG. 27 above as a transmit data and outputs it to the PtoS shift register 172.

Figure 28:
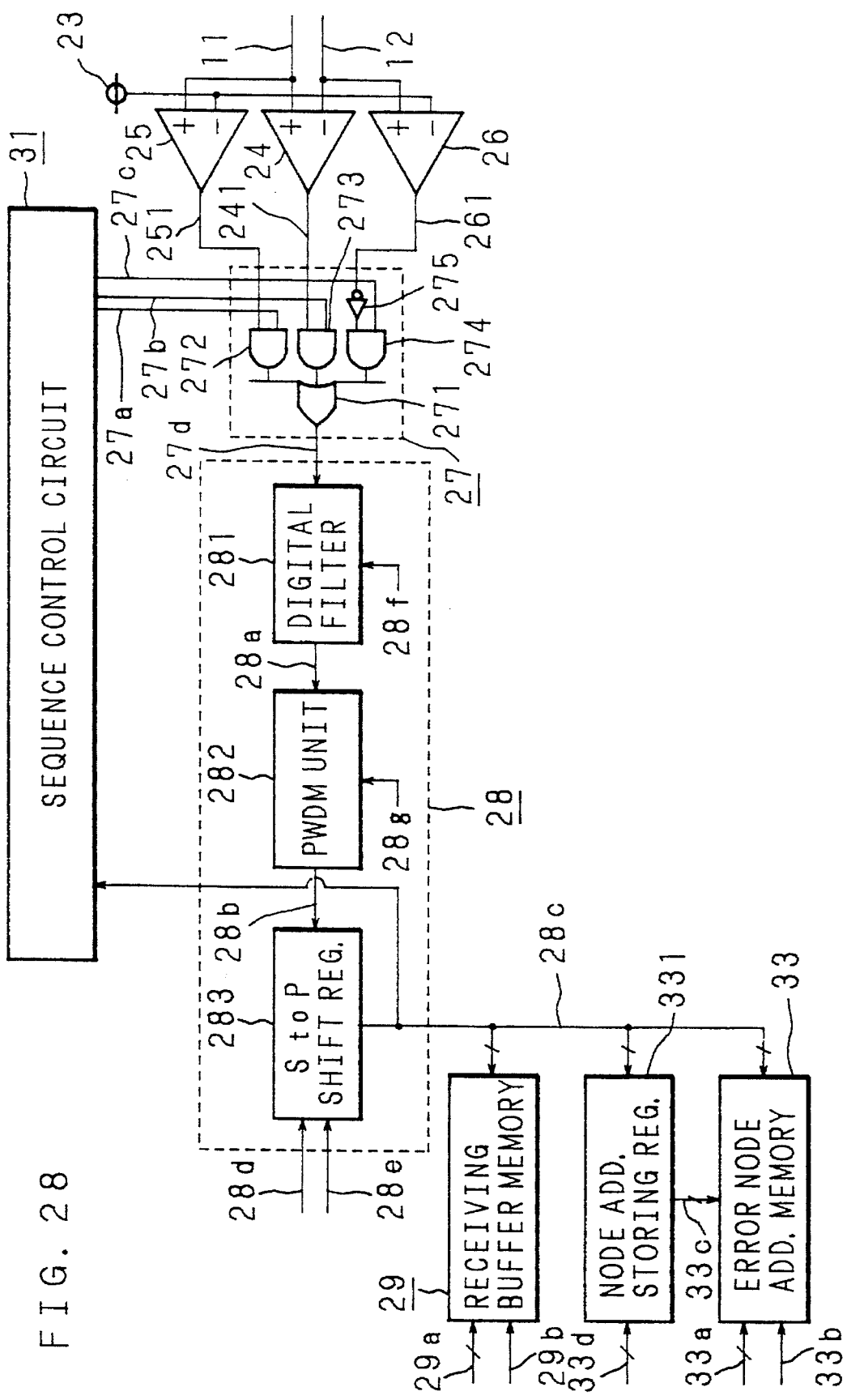
FIG. 28 is a circuit diagram and block diagram showing a configuration of the selector and receive frame decoding circuit and the peripheral devices of the transmit/receive circuit of the embodiment 4 of the communication controlling apparatus related to the present invention.

FIG. 28 is a circuit diagram and block diagram showing the selector 27, receive frame decoding circuit 28, and the peripheral devices of the embodiment 4.

In FIG. 28, the different point from FIG. 14 is that the signal 28c outputted from the StoP shift register 283 is given to the receive buffer memory 29 and node address storing register 331. The signal 28c is held in it and temporarily stored in the error node address memory 33 if need.

FIG. 29 and FIG. 30 are the timing charts showing an operation of the embodiment 4 of the communication controlling apparatus related to the present invention, wherein an error is detected and not detected, respectively.

At first, the operation in the case where an error is detected is described with reference to FIG. 29.

FIG. 7 shows that the line connecting the first node N1 to the BUS–line 12 is disconnected during the first node N1 is sending data to the other nodes.

The operation of the first node N1 in the case where the BUS–line 12 is disconnected at a timing T41 whereat the first node N1 is transmitting data to the other nodes N2, N3 ... as shown by reference numerals 111 and 112 in FIG. 29 are studied.

In this case, the transmission line error detecting circuit 30 detects an error in the BUS–line 12 and makes the error signal 30b in "H" level and outputs to the sequence control circuit 31. In addition, the error signal 30a keeps in "L" level because no error has occurred in the BUS+line 11. In response to this, the sequence control circuit 31 activates the transmit frame composing circuit 17.

The sequence control circuit 31 makes the signal 27a in "H" level from "L" level, and makes the signal 27b in "L" level from "H" level among the selector control signal 311 (27a, 27b, 27c), to the selector 27 to select the output signal 251 of from the second differential comparator 25 instead of the output signal 241 of the first differential comparator 24 as the receive data. At the timing T42 whereat the transmission line (the BUS+line 11 wherein no error has occurred in this case) becomes transmittable, the SOF 1 is transmitted.

When an error is detected again in the BUS–line 12 while sending the SOF 1, the sequence control circuit 31 makes the transmit data select signal 31f in "H" level and output it to the transmit data selector 171 at the timing T43. The transmit data selector 171, upon changing the transmit data select signal 31f in "H" level, selects the data 32d shown in FIG. 26 stored in the error detecting frame buffer 32. The data 32d is sent out following the SOF 1 which is sent out at the timing T42, as a frame 305 according to the frame format shown in FIG. 2.

By the frame 305, the broadcast code as the destination address 3 located in the second byte, the self address data as the self address 4 located in the third byte, and the code ("data 1") indicating that an error is detected in the area 5 located in the fourth byte of the frame format are sent out to all the other nodes.

Reference numerals 33a, 33b, 28c, 33c and 33d in FIG. 29 indicate the internal timing signals of the other nodes which have received the frame 305.

When all the nodes other than the first node N1 receive the frame 305 abovementioned, the data of the self address 4 (the address of the first node N1 which has sent the frame 305) which is converted into a parallel data by the StoP shift register 283 is held in a node address storing register 331 for a while because the write signal 33d is given shortly after a timing T44. When the contents of data area 5 are the code (data 1) indicating that an error is detected, the address of the first node N1 which has sent out the data of self address 4, that is, the frame 305 is written from the node address storing register 331 into the address 33a of the error node address memory 33 as the signal 33c because the write signal 33b is given shortly after a timing T45.

The operation hereafter is same as those of the embodiment example 1 above.

Next, the operation in the case where no error is detected is described with reference to the timing chart shown in FIG. 30.

An operation of the first node N1 when the BUS–line 12 is not actually disconnected at the timing T41 whereat the first node N1 is transmitting the frame 300 to the other nodes N2, N3 ... as shown by reference numerals 111 and 112 in FIG. 30 are studied.

In this case, the transmission line error detecting circuit 30 once detects the error in the BUS–line 12 and then sends the error signal 30b to the sequence control circuit 31. (The error signal 30a keeps in "L" level because no error has occurred in the BUS+line 11.) In response to this, the sequence control circuit 31 activates the transmit frame composing circuit 17.

The sequence control circuit 31 makes the signal 27a in "H" level from "L" level and makes the signal 27b in "L" level from "H" level among the selector control signal 311 (27a, 27b, 27c) to the selector 27 to select the output signal 251 of the second differential comparator 25 instead of the output signal 241 of the first differential comparator 24, as the receive data. Then, the SOF 1 is transmitted at the timing T42 when the transmission line (the BUS+line 11 wherein no error is detected in this case) becomes transmittable.

On the other hand, when no error has actually occurred in the BUS–line 12, an error is not detected in the BUS–line 12 during the SOF 1 is being sent, therefore the sequence control circuit 31 changes the transmit data select signal 31g in "H" level and gives it to the transmit data selector 171 at the timing T43. The transmit data selector 171, upon changing the transmit data select signal 31g in "H" level, selects the data 32e shown in FIG. 27 stored in the error detecting frame buffer 32. The data 32e is transmitted following the SOF 1 which is sent out at the timing T42 as the frame 306 corresponding to the frame format shown in FIG. 2.

By the frame 306, the broadcast code as the destination address 3 located in the second byte, the self address data as the self address 4 located in the third byte, and the code ("data 2") indicating that no error is detected as the data area 5 located in the fourth byte of the frame format are transmitted to all the other nodes.

Reference numerals 33a, 33b, 28c, 33c and 33d in FIG. 30 indicate the internal timing signals of the other nodes which have received the frame 306.

When the nodes other than the first node N1 receive a frame 306 abovementioned, the data of the self address 4 (the address of the first node N1 which has sent the frame 306) which is converted into a parallel data by the StoP shift register 283 is temporarily written in the node address storing register 331 because the write signal 33d is given shortly after the timing T44. When the contents of the data area 5 is the code ("data 2") indicating that no error is detected, the write signal 33b is not given later than a timing T45 and so it is not written from the node address storing register 331 into the error node address memory 33.

The operation hereafter is same as those performed in the embodiment 1.

The communication controlling apparatus related to the present invention has a transmission line error detecting circuit; wherein in the case where an error is detected in one of the transmission lines, the output gate is not immediately disabled but the data for error detection is transmitted from its own node and then whether any transmission line error is detected or not in the error detection data transmitted from its own node is determined. Therefore when no error has actually occurred in the transmission line, the state can be detected. Consequently, transfer to one-wire communication uselessly is avoided; and when an error has actually occurred in the transmission line, one of the lines can be selected for data transfer between the nodes wherein no transmission line error is detected, hence reliability of communication is improved.

The communication controlling apparatus related to the present invention has controlling means; wherein in the case where its own node has detected a circuit error, the error informing data is sent to all the other nodes. Therefore one of the lines can be selected for data transfer between the nodes which have detected no errors. This improves the reliability of communication.

The communication controlling apparatus related to the present invention has storing means which stores the nodes where line errors are detected. When data is to be received from the nodes, it is received intact. When data is received from the other nodes, its own node has the control signal that detects the line errors; therefore useless error detection can be avoided for communication with the nodes which have detected errors, and the system can be switched immediately to one-wire communication.

The communication controlling apparatus related to the present invention has controlling means; wherein in the case where its own node has detected no error, the error informing data to that effect is sent to all the other nodes. By this feature, the nodes which have detected transmission line errors can be known.

The communication controlling apparatus related to the present invention has controlling means; wherein in the case where its own node has detected a line error, the error informing data is sent to all the other nodes, and in the case where its own node has not detected any error, the error informing data to that effect is sent to all the other nodes. Thus, one of the lines can be selected for data transfer between the nodes where no transmission line error is detected and so the reliability of communication is improved.

The communication controlling apparatus related to the present invention has error detecting means which detects an error in the SOF period. Therefore, when an error has actually occurred, it is capable of detecting it immediately.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A communication controlling apparatus, comprising:

first storing means for storing transmit data to be transmitted to others;

second storing means for storing error detection data which specifies itself as a destination;

transmit frame composing means for composing a transmit frame by selecting data stored in either said first storing means or said second storing means on the basis of a first control signal, and outputting it;

first signal outputting means, which is controlled by a second control signal to be selectively placed into an activated state or inactivated state, for, in the activated state, outputting a signal as the same phase as the transmit frame output from said transmit frame composing means to a first line of a two-wire data circuit;

second signal outputting means, which is controlled by a third control signal to be selectively placed into an activated state or inactivated state, for, when in the activated state, outputting a signal of opposite phase of the transmit frame output from said transmit frame composing means to a second line of said two-wire data circuit;

receive data selecting means, to which signals transmitted via said first line and said second line of said two wire data circuit are input for, on the basis of a fourth control signal selecting receive data on the basis of one of a signal transmitted via both said first line and said second line, a signal transmitted only via said first line and a signal transmitted only via said second line;

data decoding means for decoding the data selected by said receive data selecting means;

error detecting means, connected to said first line and said second line of said two-wire data circuit, for, in the case where a line error is detected, outputting an error detection signal including information identifying a line in which an error is detected: and controlling means for, when said error detecting means does not output said error detection signal, making said transmit frame composing means select said transmit data stored in said first storing means by outputting said first control signal, activating said first signal outputting means by outputting said second control signal, activating said second signal outputting means by outputting said third control signal, and making said receive data selecting means select the data based on the signal transmitted via both said first line and said second line by outputting said fourth control signal;

for, when said error detecting means outputs said error detection signal, making said transmit frame composing means temporarily select said error detection data stored in said second storing means by outputting said first control signal, and making said receive data selecting means select the receive data based on either one of the signals transmitted only via said first line or only via said second line by outputting said fourth control signal; and for, when said error detecting means outputs said error detection signal while said receive data selecting means selects and receives a signal of said error detection data outputted to said two-wire data circuit, inactivating said first signal outputting means or said second signal outputting means which is connected to said line wherein an error is detected by outputting said second control signal or said third control signal.

2. A communication controlling apparatus, comprising:

first storing means for storing transmit data to be sent to others;

second storing means for storing error detection data which specifies itself as a destination, and error notification data including information specifying all nodes connected to a two-wire data circuit as destinations and information identifying a transmit originating node;

transmit frame composing means for composing a transmit frame by selecting data stored in either said first storing means or said second storing means on the basis of a first control signal, and outputting it;

first signal outputting means, which is controlled by a second control signal to be selectively placed into an activated state or inactivated state, for, in the activated state, outputting a signal of the same phase as the transmit frame output from said transmit frame composing means to a first line of said two-wire data circuit;

second signal outputting means, which is controlled by a third control signal to be selectively placed into an activated state or inactivated state, for, when it is in the activated state, outputting a signal of opposite phase of the transmit frame output from said transmit frame composing means to a second line of said two-wire data circuit;

receive data selecting means, to which signals transmitted via said first line and said second line of said two-wire data circuit are input for, on the basis of a fourth control signal, selecting receive data on the basis of one of a signal transmitted via both said first line and said second line, a signal transmitted only via said first line and a signal transmitted only via said second line;

data decoding means for decoding the data selected by said receive data selecting means;

error detecting means, connected to said first line and said second line of said two-wire data circuit, for, in the case where a line error is detected, outputting an error detection signal including information identifying a line in which an error is detected; and controlling means for, when said error detecting means does not output said error detection signal, making said transmit frame composing means select said transmit data stored in said first storing means by outputting said first control signal, activating said first signal outputting means by outputting said second control signal, activating said second signal outputting means by outputting said third control signal, and making said receive data selecting means select the data based on the signal transmitted via both said first line and said second line by outputting said fourth control signal;

for, when said error detecting means outputs said error detection signal, making said transmit frame composing means temporarily select said error detection data stored in said second storing means by outputting said first control signal and making said receive data selecting means select the received data based on either one of the signals transmitted only via said first line or only via said second line by outputting said fourth control signal; and for, when said error detecting means outputs said error detection signal while said receive data selecting means selects and receives a signal of said error detection data outputted to said two-wire data circuit, inactivating said first signal outputting means or said second signal outputting means which is connected to said line wherein an error is detected by outputting said second control signal or said third control signal, and making said transmit frame composing means select said error notification data stored in said second storing means by outputting said first control signal.

3. A communication controlling apparatus, comprising:

first storing means for storing transmit data, including information identifying a transmit originating node, to be transmitted to others;

second storing means for storing error detection data which specifies itself as a destination, and error notification data which specifies all nodes connected to a two-wire data circuit as destinations and includes information identifying the transmit originating node and indicating a detection of a line error;

third storing means for storing information identifying a transmit originating node when receiving said error informing data from others;

transmit frame composing means for composing a transmit frame by selecting the data stored in either said first storing means or said second storing means on the basis of a first control signal, adding a transmit start signal and outputting it;

first signal outputting means, controlled by a second control signal to be selectively placed into an activated state or inactivated state, for, in the activated state, outputting a signal of the same phase as the transmit frame outputted from said transmit frame composing means to a first line of said two-wire data circuit;

second signal outputting means, controlled by a third control signal to be selectively placed into an activated state or inactivated state, for, in the activated state, outputting a signal of an opposite phase from that of the transmit frame output from said transmit frame composing means to a second line of said two-wire data circuit;

receive data selecting means, to which signals transmitted via said first line and said second line of said two-wire data circuit are input for, on the basis of a fourth control signal, selecting receive data on the basis of either one of a signal transmitted via both said first line and said second line, a signal transmitted only via said first line and a signal transmitted only via said second line;

data decoding means for decoding data selected by said receive data selecting means;

error detecting means, connected to said first line and said second line of said two-wire data circuit, for, in the case where a line error is detected, outputting an error detection signal including information identifying a line in which an error is detected; and controlling means for, when said error detecting means does not output said error detection signal, making said transmit frame composing means select said transmit data stored in said first storing means by outputting said first control signal, activating said first signal outputting means by outputting said second control signal, activating said second signal outputting means by outputting said third control signal, and making said receive data selecting means select the data based on the signal transmitted via both said first line and said second line by outputting said fourth control signal;

for, when said transmit data is received from others while said error detecting means is outputting said error detection signal, comparing information specifying the transmit originating node included in said receive data with the information stored in said third storing means, and, when they coincide with each other, receiving said transmit data intact and, when they do not coincide with each other, making said transmit frame composing means temporarily select said error detection data stored in said second storing means by outputting said first control signal, and making said receive data selecting means select the received data based on one of the signals indicating no error transmitted only via said first line or only via said second line by outputting said fourth control signal; and for, when said error detecting means outputs said error detection signal while said receive data selecting means selects and receives a signal of said error detection data output to said two-wire data circuit, inactivating said first signal outputting means or said second signal outputting means which is connected to said line wherein an error is detected by outputting said second control signal or said third control signal.

4. A communication controlling apparatus, comprising:

first storing means for storing transmit data to be sent to others;

second storing means for storing error detection data which specifies itself as a destination, first error notification data including information specifying all others connected to a two-wire data circuit as destinations, information identifying a transmit originating node, and information indicating detection of a line error, and second error notification data including information specifying all others connected to said two-wire data circuit as destinations, information identifying a transmit originating node, and information indicating a detection of no line error;

transmit frame composing means for composing a transmit frame by selecting the data stored in either said first storing means or said second storing means on the basis of a first control signal, adding a transmit start signal indicating the start of transmission of selected data and outputting it;

first signal outputting means, controlled by a second control signal to be selectively placed into an activated state or inactivated state, for, in the activated state, outputting a signal of the same phase as the transmit frame output from said transmit frame composing means to a first line of said two-wire data circuit;

second signal outputting means, controlled by a third control signal to be selectively placed into an activated state or inactivated state, for, in the activated state, outputting a signal of opposite phase to that of the transmit frame output from said transmit frame composing means to a second line of said two-wire data circuit;

receive data selecting means, to which signals transmitted via said first line and said second line of said two-wire data circuit are input for, on the basis of a fourth control signal, selecting receive data on the basis of one of a signal transmitted via both said first line and said second line, a signal transmitted only via said first line and a signal transmitted only via said second line;

data decoding means for decoding the data selected by said receive data selecting means;

error detecting means, connected to said first line and said second line of said two-wire data circuit, for, where a line error is detected, outputting an error detection signal including information identifying a line in which an error is detected; and controlling means for, when said error detecting means does not output said error detection signal, making said transmit frame composing means select said transmit data stored in said first storing means by outputting said first control signal, activating said first signal outputting means by outputting said second control signal, activating said second signal outputting means by outputting said third control signal, and making said receive data selecting means select the data based on the signal transmitted via both said first line and said second line by outputting said fourth control signal;

for, when said error detecting means outputs said error detection signal, making said transmit frame composing means temporarily select said error detection data stored in said second storing means by outputting said first control signal, and making said receive data selecting means select the receive data on the basis of either one of the signals indicating no error transmitted only via said first line or only via said second line by outputting said fourth control signal;

for, when said error detecting means outputs said error detection signal while said receive data selecting means selects and receives a signal of said error detection data output to said two-wire data circuit, inactivating said first signal outputting means or said second signal outputting means which is connected to said line wherein an error is detected by outputting said second control signal or said third control signal, and making said transmit frame composing means select said first error notification data stored in said second storing means by outputting said first control signal, and for, when said error detecting means does not output said error detection signal while said receive data selecting means selects and receives a signal of said error detection data output to said two-wire data circuit, activating said first signal outputting means and said second signal outputting means by outputting said second control signal and said third control signal, and making said transmit frame composing means select said second error notification data stored in said second storing means by outputting said first control signal.

5. A communication controlling apparatus, comprising:

first storing means for storing transmit data to be sent to others;

second storing means for storing first error notification data including information specifying all others connected to a two-wire data circuit as destinations, information identifying a transmit originating node, and information indicating detection of a line error, and second error notification data including information specifying all others connected to said two-wire data circuit as destinations, information identifying a transmit originating node, and information indicating a detection of no line error;

transmit frame composing means for composing a transmit frame by selecting the data stored in either said first storing means or said second storing means on the basis of a first control signal, adding a transmit start signal indicating the start of transmission of the selected data and outputting it;

first signal outputting means, controlled by a second control signal to be selectively placed into an activated state or inactivated state, for, in the activated state, outputting a signal of the same phase as a transmit frame output from said transmit frame composing means to a first line of said two-wire data circuit;

second signal outputting means, controlled by a third control signal to be selectively placed into an activated state or inactivated, for, in the activated state, outputting a signal of an opposite phase to that of the transmit frame output from said transmit frame composing means to said second line of said two-wire data circuit;

receive data selecting means, to which signals transmitted via said first line and said second line of said two-wire data circuit are input for, on the basis of a fourth control signal, selecting receive data on the basis of one of a signal transmitted via both said first line and said second line, a signal transmitted only via said first line and a signal transmitted only via said second line;

data decoding means for decoding data selected by said receive data selecting means;

error detecting means, connected to said first line and said second line of said two-wire data circuit, for, where a line error is detected, outputting an error detection signal including information identifying a line in which an error is detected; and controlling means for, when said error detecting means does not output said error detection signal, making said transmit frame composing means select said transmit data stored in said first storing means by outputting said first control signal, activating said first signal outputting means by outputting said second control signal, activating said second signal outputting means by outputting said third control signal, and making said receive data selecting means select data based on the signal transmitted via both said first line and said second line by outputting said fourth control signal;

for, when said error detecting means outputs said error detection signal, making said transmit frame composing means output said transmit start signal by outputting said first control signal, and making said receive data selecting means select the received data based on either one of signals indicating no error was transmitted only via said first line or only via said second line by outputting said fourth control signal;

for, when said error detecting means outputs said error detection signal while said receive data selecting means selects and receives the signal based on said transmit start signal outputted to said two-wire data circuit, inactivating one of said first signal outputting means or said second signal outputting means whichever is connected to a line wherein an error is detected by outputting said second control signal or said third control signal, and making said transmit frame composing means select said first error notification data stored in said second storing means by outputting said first control signal thereto; and for, when said error detecting means does not output said error detection signal while said receive data selecting means selects and receives the signal based on said transmit start signal output to said two-wire data circuit, activating said first signal outputting means and said second signal outputting means by outputting said second control signal and said third control signal, and making said transmit frame composing means select said second error notification data stored in said second storing means by outputting said first control signal.

6. A communication controlling apparatus, comprising:

first storing means for storing transmit data including information identifying a transmit originating node to be sent to others;

second storing means for storing error detection data which specifies itself as a destination, and error notification data including information specifying all others connected to a two-wire data circuit as destinations, information identifying a transmit originating node, and information indicating a line of said two-wire data circuit in which an error has occurred;

third storing means for storing information identifying a transmit originating node and information indicating that an error occurred in one line of said two-wire data circuit, when receiving said error notification data from the others;

transmit frame composing means for composing a transmit frame by selecting data stored in either said first storing means or said second storing means on the basis of a first control signal, adding the transmit start signal indicating the start of transmission of selected data and outputting it;

first signal outputting means, controlled by a second control signal to be selectively placed into an activated state or inactivated state, for, in the activated state, outputting a signal of the same phase as the transmit frame output from said transmit frame composing means to said first line of said two-wire data circuit;

second signal outputting means, controlled by a third control signal to be selectively placed into an activated state or inactivated state, for, in the activated state, outputting a signal of opposite phase to that of the transmit frame output from said transmit frame composing means to said second line of said two-wire data circuit;

receive data selecting means, to which signals transmitted via said first line and said second line of said two-wire data circuit are input for, on the basis of a fourth control signal, selecting receive data on the basis of one of a signal transmitted via both said first line and said second line, a signal transmitted only via said first line and a signal transmitted only via said second line;

data decoding means for decoding data selected by said receive data selecting means;

error detecting means, connected to said first line and said second line of said two-wire data circuit, for, where a line error is detected, outputting an error detection signal including information identifying a line in which an error is detected; and controlling means for, when said error detecting means does not output said error detection signal, making said transmit frame composing means select said transmit data stored in said first storing means by outputting said first control signal, activating said first signal outputting means by outputting said second control signal, activating said second signal outputting means by outputting said third control signal, and making said receive data selecting means select data based on the signal transmitted via both said first line and said second line by outputting said fourth control signal;

for, when data is received from others and data received from others is said error notification data, storing information, included in received data, identifying the transmit originating node and information identifying that an error has occurred in a line of said two-wire data circuit and on which line the error occurred into said third storing means;

for, at a subsequent communication, making the transmit frame composing means output said transmit start signal by outputting said first control signal, and making said receive data selecting means select receive data, based on coincidence or non-coincidence of received information with the identity of a line stored in said third storing means, from among signals transmitted only via said first line or only via said second line by outputting said fourth control signal;

for, when said error detecting means outputs said error detection signal while said receive data selecting means selects and receives the signal based on said transmit start signal outputted to said two-wire data circuit, inactivating said first signal outputting means or said second signal outputting means which is connected to the line wherein an error is detected by outputting said second control signal or said third control signal, and making said transmit frame composing means select said first error notification data stored in said second storing means by outputting said first control signal; and for, when said error detecting means does not output said error detection signal while said receive data selecting means selects and receives the signal based on said transmit start signal output to said two-wire data circuit, activating said first signal outputting means and said second signal outputting means by outputting said second control signal and said third control signal, and making said transmit frame composing means select said second error notification data stored in said second storing means by outputting said first control signal.

* * * * *